United States Patent
Oh et al.

(10) Patent No.: US 11,144,225 B2
(45) Date of Patent: Oct. 12, 2021

(54) MEMORY SYSTEM, MEMORY CONTROLLER, AND OPERATION METHOD THEREOF UTILIZING AT LEAST FIRST AND SECOND OPERATIONAL MODES

(71) Applicant: SK hynix Inc., Gyeonggi-do (KR)

(72) Inventors: Yong-Seok Oh, Gyeonggi-do (KR);
Hee-Chan Shin, Gyeonggi-do (KR);
Young-Ho Ahn, Seoul (KR);
Do-Hyeong Lee, Seoul (KR);
Jin-Yeong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/781,280

(22) Filed: Feb. 4, 2020

(65) Prior Publication Data

US 2020/0409581 A1  Dec. 31, 2020

(30) Foreign Application Priority Data

Jun. 28, 2019 (KR) .................. 10-2019-0077478

(51) Int. Cl.
*G06F 3/06* (2006.01)
*G06F 12/02* (2006.01)

(52) U.S. Cl.
CPC .......... *G06F 3/0634* (2013.01); *G06F 3/0604* (2013.01); *G06F 3/0659* (2013.01); *G06F 3/0679* (2013.01); *G06F 12/0253* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 2017/0046256 A1* | 2/2017 | Horspool | G06F 3/0689 |
| 2018/0260137 A1* | 9/2018 | Tsou | G06F 12/0246 |
| 2018/0275923 A1* | 9/2018 | Earhart | G06F 3/0653 |
| 2019/0354309 A1* | 11/2019 | Brandt | G06F 3/061 |
| 2020/0073571 A1* | 3/2020 | Chen | G06F 3/0605 |

FOREIGN PATENT DOCUMENTS

| | | |
|---|---|---|
| JP | 2010-532061 A | 9/2010 |
| JP | 2013-069069 A | 4/2013 |
| JP | 2016-507095 A | 3/2016 |
| KR | 10-2014-0128852 | 11/2014 |
| KR | 10-2015-0106778 | 9/2015 |
| KR | 10-2018-0115614 | 10/2018 |

OTHER PUBLICATIONS

Office Action issued by Japan Patent Office for JP2020-040969 dated Apr. 13, 2021.

* cited by examiner

*Primary Examiner* — Jane Wei
(74) *Attorney, Agent, or Firm* — IP & T Group LLP

(57) ABSTRACT

Embodiments of the present disclosure relate to a memory system, a memory controller, and a method of operating the same, and more particularly, to a memory system, a memory controller, and a method of operating the same, which calculate a read-attribute value, a write-attribute value, and a time-attribute value for a nonvolatile memory set and determine an operation mode of the nonvolatile memory set on the basis of at least one of the read-attribute value, the write-attribute value, and the time-attribute value, thereby enabling a host to predict whether or not a memory controller executes a background operation.

17 Claims, 18 Drawing Sheets

FIG. 10

| SBLK # | 1 | | | 2 | | | 3 | | | 4 | | |
|---|---|---|---|---|---|---|---|---|---|---|---|---|
| BLK # | 1 | 2 | 3 | 1 | 2 | 3 | 1 | 2 | 3 | 1 | 2 | 3 |
| READ_CNT | 6 | 0 | 0 | 8 | 8 | 8 | 9 | 4 | 5 | 2 | 2 | 2 |
| MAX_READ_CNT | 6 | | | 8 | | | 9 | | | 2 | | |
| RR_THRESHOLD | 10 | | | 10 | | | 10 | | | 10 | | |
| AVAIL_READ_CNT | 4 | | | 2 | | | 1 | | | 8 | | |

READ_ATTR = MIN(4, 2, 1, 8) = 1

FIG. 12

| SBLK # | 1 | | 2 | | 3 | | 4 | |
|---|---|---|---|---|---|---|---|---|
| BLK # | 1 | 2 | 1 | 2 | 1 | 2 | 1 | 2 |
| Read Count | 6 | 0 | 8 | 8 | 9 | 4 | 2 | 2 |
| MAX_READ_CNT | 6 | | 8 | | 9 | | 2 | |
| RR_THRESHOLD | 10 | | 10 | | 10 | | 10 | |
| SUM_READ_CNT | 6 | | 24 | | 18 | | 6 | |
| ALL_READ_CNT | 10 | | 30 | | 20 | | 30 | |
| AVAIL_READ_CNT | 4 | | 6 | | 2 | | 24 | |

READ_ATTR = MIN(4, 6, 2, 24) = 2

MEMORY SYSTEM, MEMORY CONTROLLER, AND OPERATION METHOD THEREOF UTILIZING AT LEAST FIRST AND SECOND OPERATIONAL MODES

CROSS REFERENCE TO RELATED APPLICATION

The present application claims priority under 35 U.S.C. 119(a) to Korean patent application number 10-2019-0077478 filed on Jun. 28, 2019, which is incorporated herein by reference in its entirety.

BACKGROUND OF THE INVENTION

1. Field of the Invention

Embodiments of the present disclosure relate to a memory system, a memory controller, and a method of operating the same.

2. Description of the Prior Art

A memory system corresponding to a storage device stores data based on a request from a host such as a computer, a mobile terminal (e.g., a smart phone, a tablet PC, or the like), or any of various electronic devices. The memory system may include a device for storing data in a nonvolatile memory, such as a solid state drive (SSD), a universal flash storage (UFS) device, an embedded MMC (eMMC) device, or the like, as well as a device that stores data in a magnetic disk, such as a hard disk drive (HDD).

The memory system may further include a memory controller for controlling the memory device. The memory controller may receive a command from a host, and, based on the received command, may perform or control operations of reading, writing, or erasing data from or to a volatile memory or a nonvolatile memory included in the memory system.

At this time, the memory controller may perform a background operation (e.g., garbage collection, read-reclaim, or wear leveling) for various reasons during the operation of reading, writing, or erasing data. In this case, the background operation may increase the time required to execute the operation of reading, writing, or erasing data, thereby increasing a delay time for the memory controller to process a command received from the host. However, the host cannot predict whether the memory controller performs the background operation, and thus the host cannot handle the problem of an increase in the delay time in advance.

SUMMARY OF THE INVENTION

Embodiments of the present disclosure may provide a memory system, a memory controller, and a method of operating the same, which enable a host to more accurately predict whether a memory controller is to perform a background operation.

In addition, embodiments of the present disclosure may provide a memory system, a memory controller, and a method of operating the same, which enable a host to handle, in advance, the situation in which a delay time is likely to increase.

In addition, embodiments of the present disclosure may provide a memory system, a memory controller, and a method of operating the same, which provide higher quality of service (QoS) to a host.

According to an aspect, embodiments of the present disclosure may provide a memory system including a nonvolatile memory set that includes one or more nonvolatile memories and a memory controller that controls the nonvolatile memory set.

The memory controller may calculate a read-attribute value, a write-attribute value, and a time-attribute value for the nonvolatile memory set, and may determine an operation mode of the nonvolatile memory set on the basis of at least one of the read-attribute value, the write-attribute value, and the time-attribute value.

When the operation mode is a first operation mode, the memory controller may control a background operation not to execute on the nonvolatile memory set.

On the other hand, When the operation mode is a second operation mode, the memory controller may control a background operation to execute on the nonvolatile memory set.

When set target conditions are satisfied when the operation mode is the second operation mode, the memory controller may stop the background operation on the nonvolatile memory set, and may switch to a state in which the operation mode is ready to be switched to the first operation mode.

The memory controller may switch the operation mode from the first operation mode to the second operation mode when a read-attribute value is less than or equal to a first threshold read-attribute value, or when a write-attribute value is less than or equal to a first threshold write-attribute value, or when a time-attribute value is less than or equal to a first threshold time-attribute value.

The target conditions may be that the read-attribute value is greater than or equal to a second threshold read-attribute value, that the write-attribute value is greater than or equal to a second threshold write-attribute value, and that the time-attribute value is greater than or equal to a second threshold time-attribute value.

The nonvolatile memory set may include one or more super memory blocks. Each of the super memory blocks may include one or more memory blocks. In addition, the memory block included in each of the super memory blocks may be included in any one of nonvolatile memories included in the nonvolatile memory set.

The aforementioned read-attribute value, for example, may be determined on the basis of a difference between a maximum read-count value of each of the super memory blocks and a threshold read-reclaim read-count value for the super memory block.

As another example, the aforementioned read-attribute value may be determined on the basis of a maximum read-count value of each of the super memory blocks, a sum read-count value of each of the super memory blocks, and a threshold read-reclaim read-count value for the super memory block.

The aforementioned write-attribute value, for example, may be determined on the basis of a sum of the number of reserved super memory blocks and the number of free super memory blocks, among the super memory blocks included in the nonvolatile memory set.

According to another aspect, embodiments of the present disclosure may provide a memory controller including a memory interface configured to communicate with a nonvolatile memory set including one or more nonvolatile memories and a control circuit.

The control circuit may calculate a read-attribute value, a write-attribute value, and a time-attribute value for the nonvolatile memory set, and may determine an operation mode of the nonvolatile memory set on the basis of at least one of the read-attribute value, the write-attribute value, and the time-attribute value.

When the operation mode is a first operation mode, the control circuit may control a background operation not to execute on the nonvolatile memory set.

On the other hand, when the operation mode is a second operation mode, the control circuit may control a background operation to execute on the nonvolatile memory set.

When set target conditions are satisfied when the operation mode is the second operation mode, the control circuit may stop the background operation on the nonvolatile memory set, and may switch to a state in which the operation mode is able to be switched to the first operation mode.

The control circuit may switch the operation mode from the first operation mode to the second operation mode when a read-attribute value is less than or equal to a first threshold read-attribute value, or when a write-attribute value is less than or equal to a first threshold write-attribute value, or when a time-attribute value is less than or equal to a first threshold time-attribute value.

The target conditions may be that the read-attribute value is greater than or equal to a second threshold read-attribute value, that the write-attribute value is greater than or equal to a second threshold write-attribute value, and that the time-attribute value is greater than or equal to a second threshold time-attribute value.

The nonvolatile memory set may include one or more super memory blocks. Each of the super memory blocks may include one or more memory blocks. In addition, the memory block included in each of the super memory blocks may be included in any one of nonvolatile memories included in the nonvolatile memory set.

The aforementioned read-attribute value, for example, may be determined on the basis of a difference between a maximum read-count value of each of the super memory blocks and a threshold read-reclaim read-count value for the super memory block.

As another example, the aforementioned read-attribute value may be determined on the basis of a maximum read-count value of each of the super memory blocks, a sum read-count value of each of the super memory blocks, and a threshold read-reclaim read-count value for the super memory block.

The aforementioned write-attribute value, for example, may be determined on the basis of a sum of the number of reserved super memory blocks and the number of free super memory blocks, among the super memory blocks included in the nonvolatile memory set.

According to another aspect, embodiments of the present disclosure may provide a method of operating a memory controller for controlling a nonvolatile memory set including one or more nonvolatile memories.

The method of operating the memory controller may include a step of calculating a read-attribute value, a write-attribute value, and a time-attribute value for the nonvolatile memory set.

The method of operating the memory controller may include a step of determining the operation mode of the nonvolatile memory set on the basis of at least one of the read-attribute value, the write-attribute value, and the time-attribute value.

When the operation mode is a first operation mode, the memory controller may control a background operation not to execute on the nonvolatile memory set.

On the other hand, when the operation mode is a second operation mode, the memory controller may control a background operation to execute on the nonvolatile memory set.

If set target conditions are satisfied when the operation mode is the second operation mode, the memory controller may stop the background operation on the nonvolatile memory set, and may switch to a state in which the operation mode is able to be switched to the first operation mode.

The memory controller may switch the operation mode from the first operation mode to the second operation mode when a read-attribute value is less than or equal to a first threshold read-attribute value, or when a write-attribute value is less than or equal to a first threshold write-attribute value, or when a time-attribute value is less than or equal to a first threshold time-attribute value.

The target conditions may be that the read-attribute value is greater than or equal to a second threshold read-attribute value, that the write-attribute value is greater than or equal to a second threshold write-attribute value, and that the time-attribute value is greater than or equal to a second threshold time-attribute value.

According to another aspect, embodiments of the present disclosure may provide a memory system including a memory device including plural memory blocks and a controller configured to control the memory device.

The controller may control the memory device to enter one of first and second operation modes based on one or more of a read-attribute value, a write-attribute value and a time-attribute value of the memory blocks.

The controller may control to enter by itself the first operation mode when all of the read-attribute value, the write-attribute value and the time-attribute value are equal to respective thresholds or greater.

The controller may control to perform a foreground operation without a background operation in the first operation mode.

The controller may control to perform a foreground operation together with the background operation in the second operation mode.

According to embodiments of the present disclosure, it is possible to provide a memory system, a memory controller, and a method of operating the same, which enable a host to more accurately predict whether or not a memory controller is to perform a background operation.

In addition, according to embodiments of the present disclosure, it is possible to provide a memory system, a memory controller, and a method of operating the same, which enable a host to handle, in advance, a situation in which a delay time is likely to increase.

In addition, according to embodiments of the present disclosure, it is possible to provide a memory system, a memory controller, and a method of operating the same, which provide higher QoS to a host.

BRIEF DESCRIPTION OF THE DRAWINGS

The above and other aspects, features, and advantages of the present disclosure will be more apparent from the following detailed description taken in conjunction with the accompanying drawings, in which:

FIG. 10 is a diagram illustrating obtaining a read-attribute value for a nonvolatile memory set by applying the method described with reference to FIG. 9;

FIG. 12 is a diagram illustrating obtaining a read-attribute value for a nonvolatile memory set by applying the method described with reference to FIG. 11;

DETAILED DESCRIPTION

Hereinafter, embodiments of the disclosure will be described in detail with reference to the accompanying drawings.

Figure 1:
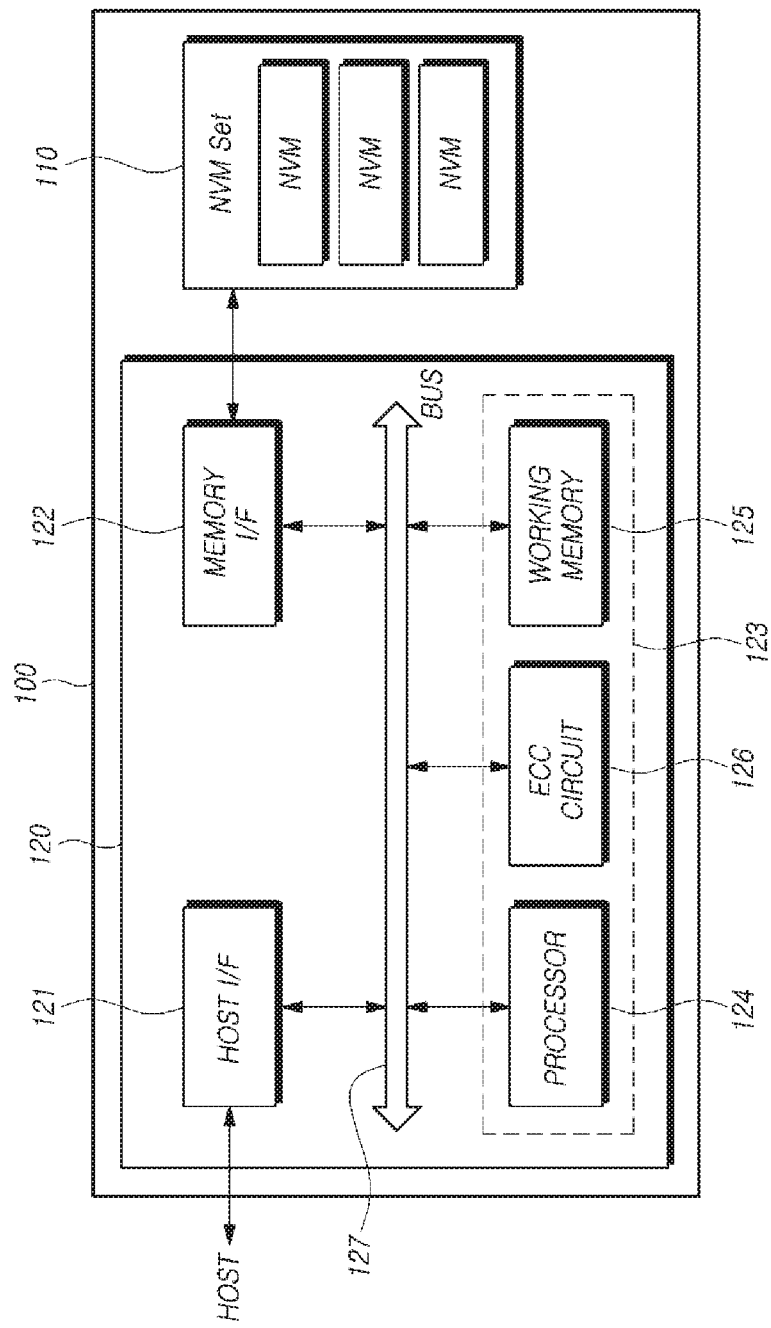
FIG. 1 is a diagram schematically illustrating the configuration of a memory system according to embodiments of the present disclosure.

FIG. 1 is a diagram schematically illustrating the configuration of a memory system according to embodiments of the present disclosure.

Referring to FIG. 1, a memory system 100 according to embodiments of the present disclosure may include a nonvolatile memory set 110 and a memory controller 120 that controls the nonvolatile memory set 110.

The nonvolatile memory set 110 may include one or more nonvolatile memories (NVM), and each of the nonvolatile memories (NVM) may include a plurality of memory blocks. The nonvolatile memory set 110 may operate in response to the control of the memory controller 120.

The operation of the nonvolatile memory set 110 may include, for example, a read operation, a program operation (also, referred to as a "write operation"), an erase operation, and the like.

Each of the nonvolatile memories (NVM) included in the nonvolatile memory set 110 may include a memory cell array including a plurality of memory cells (hereinafter, simply referred to as "cells") that store data. Such a memory cell array may exist inside a memory block.

For example, the nonvolatile memory (NVM) may be implemented in any of various types, such as NAND flash memory, vertical NAND flash memory, NOR flash memory, phase-change memory (PRAM), magnetoresistive random access memory (MRAM), ferroelectric random access memory (FRAM), and the like.

Meanwhile, the nonvolatile memory (NVM) may be implemented as a three-dimensional array structure. Embodiments of the disclosure may be applied to a charge trap flash (CTF) in which a charge storage layer is made of an insulating film, as well as to a flash memory device in which the charge storage layer is made of a conductive floating gate.

The nonvolatile memory set 110 may be configured to receive a command, an address, or the like from the memory controller 120 and to access the area selected by the address in the memory cell array. That is, the nonvolatile memory set 110 may perform an operation corresponding to a command on the area selected by the address.

For example, the nonvolatile memory set 110 may perform a program operation, a read operation, an erase operation, and the like. In this regard, during the program operation, the nonvolatile memory set 110 may program data in the area selected by the address. In the read operation, the nonvolatile memory set 110 may read data from the area selected by the address. In the erase operation, the nonvolatile memory set 110 may erase data stored in the area selected by the address.

The memory controller 120 may control write (program), read, erase, and background operations on the nonvolatile memory set 110. The background operation may include, for example, at least one of garbage collection GC, wear levelling WL, bad block management (BBM), and the like.

The memory controller 120 may control the operation of the nonvolatile memory set 110 according to a request of a host HOST. Alternatively, the memory controller 120 may control the operation of the nonvolatile memory set 110, regardless of the request of the host HOST.

Meanwhile, the memory controller 120 and the host HOST may be separate devices. In some cases, the memory controller 120 and the host HOST may be integrated into one device. In the following description, the memory controller 120 and the host HOST will be described as being separate from each other.

Referring to FIG. 1, the memory controller 120 may include a memory interface 122 and a control circuit 123, and may further include a host interface 121.

The host interface 121 provides an interface for communication with the host HOST.

The control circuit 123 may receive a command from the host HOST through the host interface 121, and may process the received command.

The memory interface 122 is connected to the nonvolatile memory set 110 to provide an interface for communication with the nonvolatile memory set 110. That is, the memory interface 122 may be configured to provide an interface between the nonvolatile memory set 110 and the memory controller 120 in response to the control of the control circuit 123.

The control circuit 123 performs the overall control operation of the memory controller 120, thereby controlling the operation of the nonvolatile memory set 110. To this end, for example, the control circuit 123 may include at least one of a processor 124, a working memory 125, and the like. In some cases, the control circuit 123 may further include an error detection and correction circuit (ECC circuit) 126.

The processor 124 may control the overall operation of the memory controller 120, and may perform logical operations. The processor 124 may communicate with the host HOST through the host interface 121, and may communicate with the nonvolatile memory set 110 through the memory interface 122.

The processor 124 may perform the function of a flash translation layer (FTL). The processor 124 may convert a logical block address (LBA) provided by the host into a physical block address (PBA) through the FTL. The FTL may receive a logical block address (LBA), and may convert the same into a physical block address (PBA) by means of a mapping table.

There are several methods of mapping the addresses by the flash translation layer depending on a mapping unit. Typical address mapping methods include a page mapping method, a block mapping method, and a hybrid mapping method.

The processor 124 is configured to randomize the data received from the host HOST. For example, the processor 124 may randomize data received from the host HOST using a randomizing seed. The randomized data is provided to the nonvolatile memory set 110 as data to be stored, and is programmed in the memory cell array.

The processor 124 is configured to derandomize data received from the nonvolatile memory set 110 during a read operation. For example, the processor 124 may derandomize the data received from the nonvolatile memory set 110 using the derandomizing seed. The derandomized data may be output to the host HOST.

The processor 124 may execute firmware to control the operation of the memory controller 120. In other words, the processor 124 may execute (drive) the firmware loaded in the working memory 125 at the time of booting in order to control the overall operation of the memory controller 120 and perform logical operation.

The firmware is a program executed in the memory system 100, and may include various functional layers.

For example, the firmware may include at least one of a FTL that performs conversion between a logical address requested by the host HOST to the memory system 100 and a physical address of the nonvolatile memory set 110, a host interface layer (HIL) that interprets a command requested by the host HOST to the memory system 100, that is, a storage device, and transmits the same to the FTL, a flash interface layer (FIL) that transmits a command indicated by the FTL to the nonvolatile memory set 110.

The firmware, for example, may be stored in the nonvolatile memory set 110, and may then be loaded in the working memory 125.

The working memory 125 may store firmware, program code, commands, or data necessary for driving the memory controller 120. The working memory 125 may include, for example, as a volatile memory, at least one of static RAM (SRAM), dynamic RAM (DRAM), synchronous DRAM (SDRAM), and the like.

The error detection and correction circuit 126 may be configured to detect an error bit of the data to be checked using an error correction code and to correct the detected error bit. Here, the data to be checked may be, for example, data stored in the working memory 125 or data read from the nonvolatile memory set 110.

The error detection and correction circuit 126 may be implemented to decode the data with the error correction code. The error detection and correction circuit 126 may be implemented as any of various code decoders. For example, a decoder that performs unsystematic code decoding or a decoder that performs systematic code decoding may be used.

For example, the error detection and correction circuit 126 may detect an error bit in sector units for each piece of read data. That is, each piece of read data may include a plurality of sectors. A sector may be a smaller data unit than a page, which is a read unit of the flash memory. Sectors constituting each piece of read data may be arranged relative to each other using addresses.

The error detection and correction circuit 126 may produce a bit error rate (BER), and may determine whether correction is possible in units of sectors. If the BER is higher than a reference value, the error detection and correction circuit 126 may determine that the corresponding sector is uncorrectable (or has failed). On the other hand, if the BER is lower than a reference value, the error detection and correction circuit 126 may determine that the corresponding sector is correctable (or passed).

The error detection and correction circuit 126 may sequentially perform the error detection and correction operation on all read data. If the sector included in the read data is correctable, the error detection and correction circuit 126 may omit the error detection and correction operation on the corresponding sector for the next read data. If the error detection and correction operation for all read data is completed as described above, the error detection and correction circuit 126 may detect a sector determined to be uncorrectable. One or more sectors may be determined to be uncorrectable. The error detection and correction circuit 126 may transmit information about the sectors determined to be uncorrectable (e.g., address information) to the processor 124.

The bus 127 may be configured to provide a channel between the components 121, 122, 124, 125, and 126 of the memory controller 120. The bus 127 may include, for example, a control bus for transmitting various control signals, commands, and the like, and a data bus for transmitting a variety of data.

The above-described components 121, 122, 124, 125, and 126 of the memory controller 120 are only examples. Some of the aforementioned components 121, 122, 124, 125, and 126 of the memory controller 120 may be excluded, or may be integrated into one element. In some cases, one or more other components may be added in addition to the aforementioned components of the memory controller 120.

Hereinafter, the nonvolatile memory included in the nonvolatile memory set 110 will be described in more detail with reference to FIG. 2.

Figure 2:
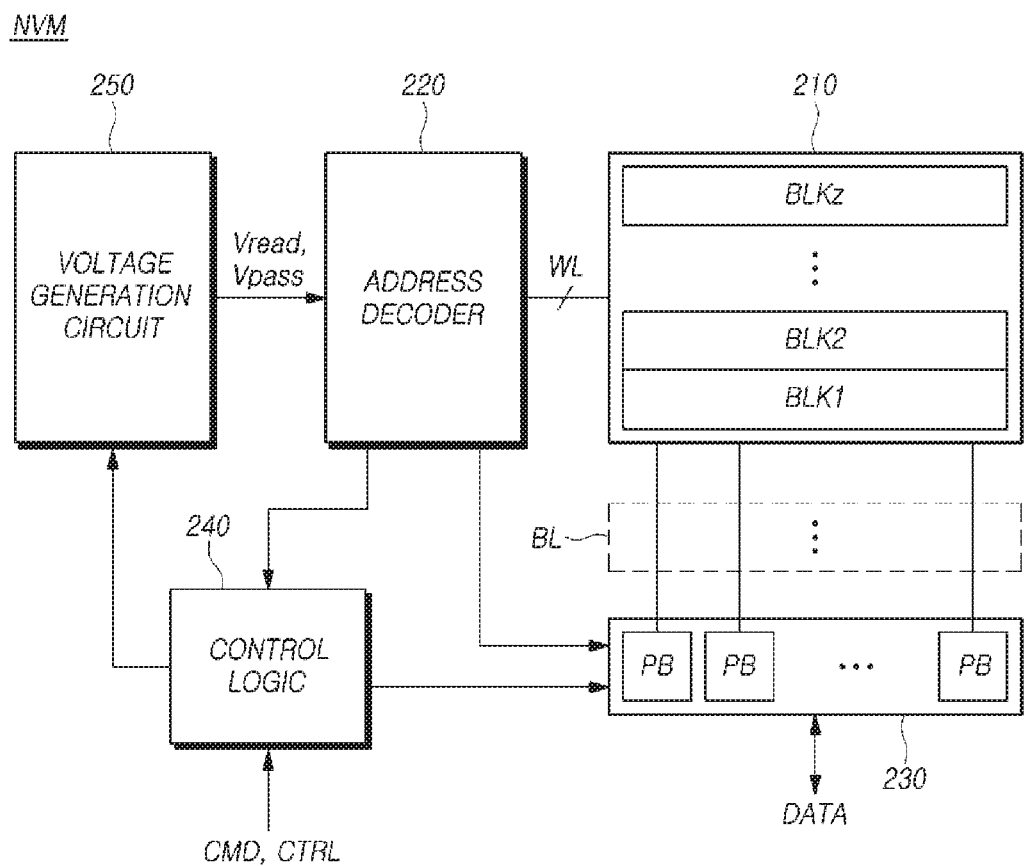
FIG. 2 is a diagram schematically illustrating a nonvolatile memory according to embodiments of the present disclosure.

FIG. 2 is a diagram schematically illustrating a nonvolatile memory according to embodiments of the present disclosure.

Referring to FIG. 2, the nonvolatile memory according to embodiments of the present disclosure may include a memory cell array 210, an address decoder 220, a read-and-write circuit 230, a control logic 240, a voltage generation circuit 250, and the like.

The memory cell array 210 may include a plurality of memory blocks BLK1 to BLKz (where z is a natural number of 2 or more).

In the plurality of memory blocks BLK1 to BLKz, a plurality of word lines WL and a plurality of bit lines BL may be disposed, and a plurality of memory cells MC may be arranged.

The plurality of memory blocks BLK1 to BLKz may be connected to the address decoder 220 through the plurality of word lines WL. The plurality of memory blocks BLK1 to BLKz may be connected to the read-and-write circuit 230 through the plurality of bit lines BL.

Each of the plurality of memory blocks BLK1 to BLKz may include a plurality of memory cells. For example, the plurality of memory cells may be nonvolatile memory cells having a vertical channel structure.

The memory cell array 210 may be configured as a memory cell array having a two-dimensional structure, or in some cases, may be configured as a memory cell array having a three-dimensional structure.

Each of the plurality of memory cells included in the memory cell array 210 may store at least one bit of data. For example, each of the plurality of memory cells included in the memory cell array 210 may be a single-level cell (SLC) that stores one bit of data. As another example, each of the plurality of memory cells included in the memory cell array 210 may be a multi-level cell (MLC) that stores two bits of data. As another example, each of the plurality of memory cells included in the memory cell array 210 may be a triple-level cell (TLC) that stores three bits of data. As another example, each of the plurality of memory cells included in the memory cell array 210 may be a quad-level cell (QLC) that stores 4 bits of data. As another example, the memory cell array 210 may include a plurality of memory cells each storing five or more bits of data.

Referring to FIG. 2, the address decoder 220, the read-and-write circuit 230, the control logic 240, and the voltage generation circuit 250 may operate as peripheral circuits for driving the memory cell array 210.

The address decoder 220 may be connected to the memory cell array 210 through a plurality of word lines WL.

The address decoder 220 may be configured to operate in response to the control of the control logic 240.

The address decoder 220 may receive addresses through an input/output buffer inside the nonvolatile memory. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

When applying a read voltage during the read operation, the address decoder 220 may apply a read voltage Vread to a selected word line WL in a selected memory block, and may apply a pass voltage Vpass to the remaining unselected word lines WL.

In a program verification operation, the address decoder 220 may apply a verification voltage generated from the voltage generation circuit 250 to a selected word line WL in the selected memory block, and may apply a pass voltage Vpass to the remaining unselected word lines WL.

The address decoder 220 may be configured to decode column addresses of the received addresses. The address decoder 220 may transmit the decoded column addresses to the read-and-write circuit 230.

The read operation and the program operation of the nonvolatile memory may be performed in units of pages. The address received when requesting the read operation and the program operation may include at least one of a block address, a row address, and a column address.

The address decoder 220 may select one memory block and one word line according to the block address and the row address. The column address may be decoded by the address decoder 220 to be provided to the read-and-write circuit 230.

The address decoder 220 may include at least one of a block decoder, a row decoder, a column decoder, an address buffer, and the like.

The read-and-write circuit 230 may include a plurality of page buffers PB. The read-and-write circuit 230 may operate as a "read circuit" during the read operation of the memory cell array 210, and may operate as a "write circuit" during the write operation thereof.

The above-described read-and-write circuit 230 may also be referred to as a "page buffer circuit" or a "data register circuit" including a plurality of page buffers PB. Here, the read-and-write circuit 230 may include a data buffer for a function of data processing, and in some cases, may further include a cache buffer for a caching function.

A plurality of page buffers PB may be connected to the memory cell array 210 through a plurality of bit lines BL. In order to sense threshold voltages Vth of the memory cells during the read operation and the program verification operation, the plurality of page buffers PB may continue to supply a sensing current to the bit lines BL connected to the memory cells, and may detect a change in the amount of current flowing according to the program state of the corresponding memory cell through a sensing node which is then latched as sensing data.

The read-and-write circuit 230 may operate in response to page buffer control signals output from the control logic 240.

In the read operation, the read-and-write circuit 230 senses data of the memory cell to temporarily store the read data, and then outputs the data DATA to the input/output buffer of the nonvolatile memory. In an embodiment, the read-and-write circuit 230 may include a column selection circuit, as well as the page buffers PBs or page registers.

The control logic 240 may be connected to the address decoder 220, the read-and-write circuit 230, and the voltage generation circuit 250. The control logic 240 may receive a command CMD and a control signal CTRL through an input/output buffer of the nonvolatile memory.

The control logic 240 may be configured to control the overall operation of the nonvolatile memory in response to the control signal CTRL. The control logic 240 may output a control signal for adjusting the precharge potential levels of the sensing nodes of the plurality of page buffers PB.

The control logic 240 may control the read-and-write circuit 230 to perform a read operation on the memory cell array 210. The voltage generation circuit 250 may generate a read voltage Vread and a pass voltage Vpass used in the read operation in response to the voltage generation circuit control signal output from the control logic 240.

Figure 3:
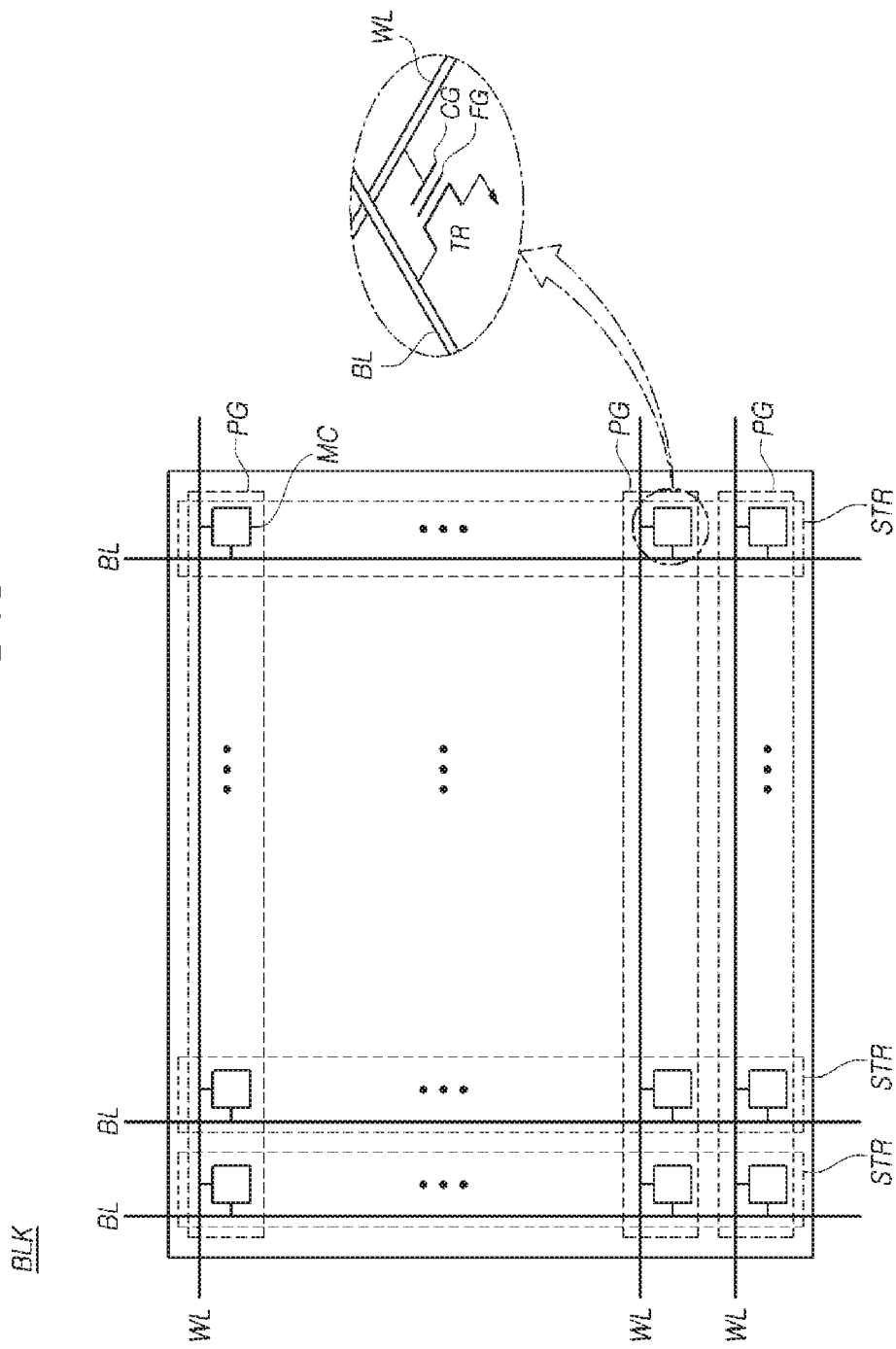
FIG. 3 is a diagram schematically illustrating the structure of a memory block included in a nonvolatile memory according to embodiments of the present disclosure.

FIG. 3 is a diagram schematically illustrating the structure of a memory block included in a nonvolatile memory according to embodiments of the present disclosure.

Referring to FIG. 3, the memory block BLK included in the nonvolatile memory may be configured as, for example, a plurality of pages PG and a plurality of strings STR intersecting each other.

The plurality of pages PG corresponds to the plurality of word lines WL, and the plurality of strings STR corresponds to the plurality of bit lines BL.

The plurality of word lines WL and the plurality of bit lines BL may be arranged to intersect each other in the memory block BLK. For example, the respective word lines of the plurality of word lines WL may be arranged in a row direction, and the respective nit lines of the plurality of bit lines BL may be arranged in a column direction. As another example, the respective word lines of the plurality of word lines WL may be arranged in a column direction, and the respective bit lines of the plurality of bit lines BL may be arranged in a row direction.

The plurality of word lines WL and the plurality of bit lines BL intersect each other, thereby defining a plurality of memory cells MC. A transistor TR may be disposed in each memory cell MC.

For example, the transistor TR disposed in each memory cell MC may include a drain, a source, a gate, and the like. The drain (or source) of the transistor TR may be connected to a corresponding bit line BL directly or via another transistor TR. The source (or drain) of the transistor TR may be connected to the source line (which may be the ground) directly or via another transistor TR. The gate of the transistor TR may include a floating gate FG surrounded by an insulator and a control gate CG to which a gate voltage is applied from the word line WL.

Each of the plurality of memory blocks BLK1 to BLKz may further include a first selection line (also referred to as a "source selection line" or a "drain selection line") arranged outside a first outermost word line, which is closer to the read-and-write circuit 230, among two outermost word lines, and a second selection line (also referred to as a "drain selection line" or a "source selection line") arranged outside a second outermost word line.

In some cases, one or more dummy word lines may be further arranged between the first outermost word line and the first selection line. In addition, one or more dummy word lines may be further arranged between the second outermost word line and the second selection line.

With the memory block structure shown in FIG. 3, the read operation and the program operation (write operation) may be performed in units of pages, and the erase operation may be performed in units of memory blocks.

Figure 4:
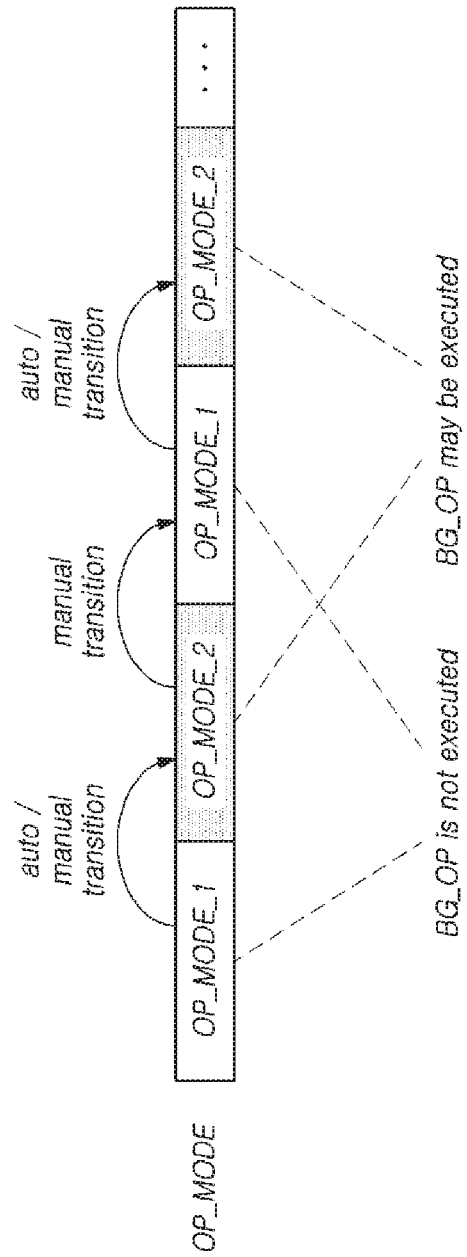
FIG. 4 is a diagram schematically illustrating an operation mode for a nonvolatile memory set according to embodiments of the present disclosure.

FIG. 4 is a diagram schematically illustrating an operation mode for a nonvolatile memory set 110 according to embodiments of the present disclosure.

Referring to FIG. 4, an operation mode OP_MODE for the nonvolatile memory set 110 may be a first operation mode OP_MODE_1 or a second operation mode OP_MODE_2.

The memory controller 120 may determine the operation mode OP_MODE for the nonvolatile memory set 110 to be one of either the first operation mode OP_MODE_1 or the second operation mode OP_MODE_2.

The memory controller 120 may manage the operation mode OP_MODE in any of various ways. For example, the memory controller 120 may manage the operation mode OP_MODE using a flag value, and in another example, the memory controller 120 may manage the operation mode OP_MODE using a status window.

The operation mode OP_MODE for the nonvolatile memory set 110 may switch from the first operation mode OP_MODE_1 to the second operation mode OP_MODE_2, or may switch from the second operation mode OP_MODE_2 to the first operation mode OP_MODE_1 over time.

In this case, switching of the operation mode from the first operation mode OP_MODE_1 to the second operation mode OP_MODE_2 may be performed in response to a command from the memory controller 120 or may be performed without the command if set conditions are satisfied. On the other hand, switching of the operation mode from the second operation mode OP_MODE_2 to the first operation mode OP_MODE_1 may be performed only in response to a command from the memory controller 120.

Hereinafter, the switching of the operation mode OP_MODE will be described in detail with reference to FIG. 7.

Meanwhile, the difference between the first operation mode OP_MODE_1 and the second operation mode OP_MODE_2 is as follows.

If the operation mode OP_MODE is the first operation mode OP_MODE_1, the memory controller 120 may perform control such that a background operation BG_OP on the nonvolatile memory set 110 is not executed. The background operation BG_OP may be, for example, garbage collection GC, read reclaim RR, wear levelling WL, or the like.

In this case, there is no latency caused when the background operation is executed in the process in which the memory controller 120 processes a command (e.g., a read command/write command) received from a host. Therefore, the memory controller 120 may process the command received from the host HOST within a set estimated time, thereby providing a high quality of service (QoS) to the host HOST. In addition, the host may predict that the command transmitted to the memory controller 120 will be processed within a set estimated time.

On the other hand, if the operation mode OP_MODE is the second operation mode OP_MODE_2, the memory controller 120 may perform control such that the background operation BG_OP on the nonvolatile memory set 110 is executed.

In this case, there may be latency caused when the background operation BG_OP is executed in the process in which the memory controller 120 processes a command (e.g., a read command/write command) received from a host.

Therefore, the time taken for the memory controller 120 to process the command received from the host HOST may exceed a set estimated time.

In addition, if the current operation mode OP_MODE is the second operation mode OP_MODE_2, the host HOST may predict that the memory controller 120 may perform a background operation, and may determine that the command transmitted to the memory controller 120 is likely to be processed beyond a set estimated time. Therefore, the host HOST is able to handle in advance the problem of increasing the delay time due to the background operation in second operation mode OP_MODE_2.

That is, the memory controller 120 switches the operation mode OP_MODE to the first operation mode OP_MODE_1 or the second operation mode OP_MODE_2, and performs control such that the background operation is executed only if the operation mode OP_MODE is the second operation mode OP_MODE_2. It is different from a general case, in which background operation is performed only in an idle state regardless of operation mode.

Meanwhile, a victim memory block, which is the target of the background operation when the memory controller 120 performs a background operation in the second operation mode OP_MODE_2, may be determined in any of various ways.

As an example, a read-reclaim operation must be performed on a memory block having a read-count value equal to or greater than a threshold read-count value of 100. In this case, the memory controller 120 may select only memory blocks having read-count values equal to or greater than a threshold read-count value of 100 as victim memory blocks. Alternatively, the memory controller 120 may select memory blocks having read-count values of which the differences from a threshold read-count value are equal to or less than a set value as victim memory blocks. For example, the memory controller 120 may also select memory blocks having read-count values less than 100 (e.g., 90) as victim memory blocks.

As another example, if the number of free memory blocks in which data is ready to be written is less than 20, garbage collection must be executed until the number of free memory blocks reaches 20 or more.

In this case, the memory controller 120 may select victim memory blocks on which to execute the garbage collection until the number of free memory blocks reaches 20. Alternatively, the memory controller 120 may select victim memory blocks until the number of free memory blocks becomes more than 20 (e.g., 25), thereby executing garbage collection.

Selecting memory blocks on which the background operation does not need to be executed immediately as victim memory blocks is intended to increase the time during which the operation mode OP_MODE is the first operation mode OP_MODE_1 after the background operation is completed. This is due to the fact that the time required to perform the background operation again after the background operation is completed increases because a large number of victim memory blocks is selected during the background operation.

Hereinafter, the above-described switching of the operation mode will be described with reference to the flowchart in FIG. 5.

Figure 5:
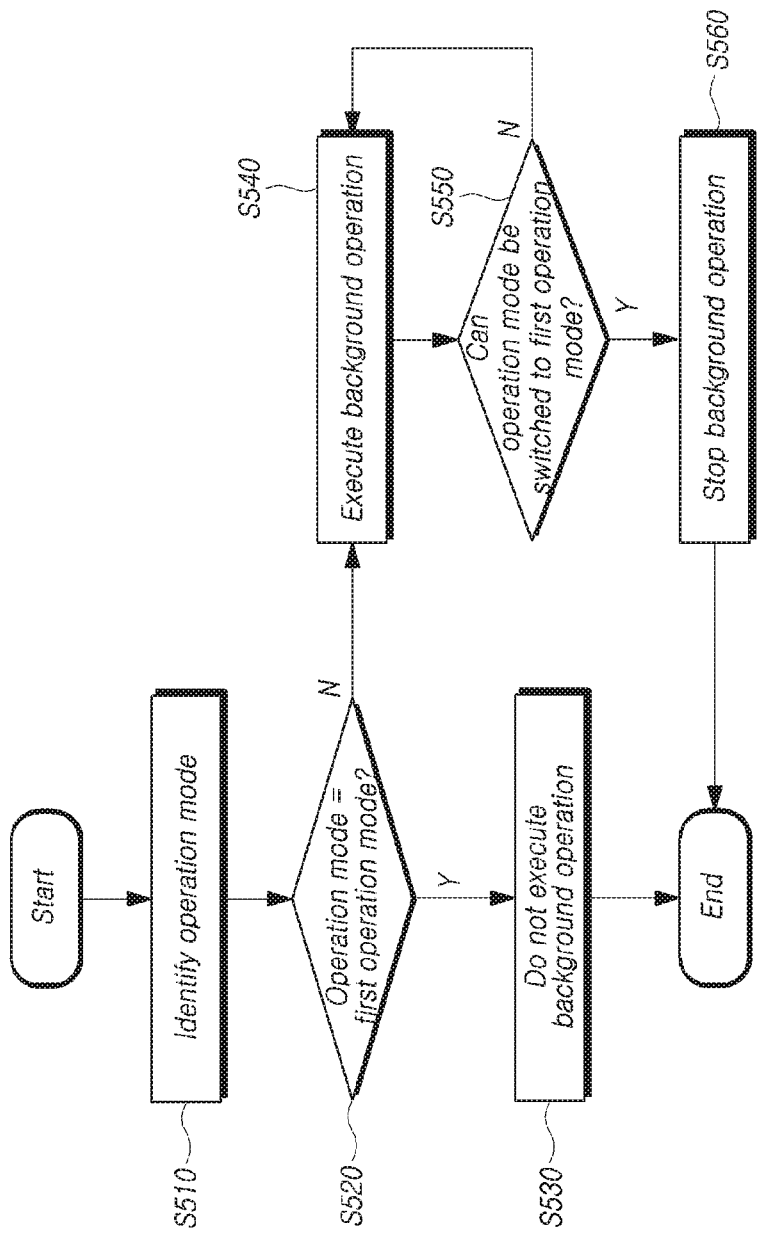
FIG. 5 is a flowchart illustrating an operation according to an operation mode of a nonvolatile memory set according to embodiments of the present disclosure.

FIG. 5 is a flowchart illustrating an operation depending on the operation mode of a nonvolatile memory set according to embodiments of the present disclosure.

Referring to FIG. 5, first, the memory controller 120 may identify the current operation mode (S510).

In addition, the memory controller 120 determines whether or not the operation mode OP_MODE is a first operation mode OP_MODE_1 (S520).

If the current operation mode OP_MODE is the first operation mode OP_MODE_1 ("Y" in S520), the memory controller 120 does not execute a background operation (S530).

On the other hand, if the current operation mode OP_MODE is not the first operation mode OP_MODE_1 (that is, if the current operation mode is a second operation mode OP_MODE_2) ("N" in S520), the memory controller 120 may execute a background operation (S540).

After step S540, the memory controller 120 determines whether or not the operation mode OP_MODE is ready to be switched from the second operation mode OP_MODE_2 to the first operation mode OP_MODE_1 (S550).

If it is determined that the operation mode OP_MODE is ready to be switched to the first operation mode OP_MODE_1 ("Y" in S550), the memory controller 120 may stop the background operation currently being executed (S560). On the other hand, if it is determined that the operation mode OP_MODE is not ready to be switched to the first operation mode OP_MODE_1 ("N" in S550), the memory controller 120 repeats steps S540 and S550 until it is determined that the operation mode OP_MODE is ready to be switched to the first operation mode OP_MODE_1.

The method of determining the operation mode described above with reference to FIGS. 4 and 5 may be performed in any of various ways. Hereinafter, a method of determining the operation mode using attribute values according to embodiments of the present disclosure will be described.

Figure 6:
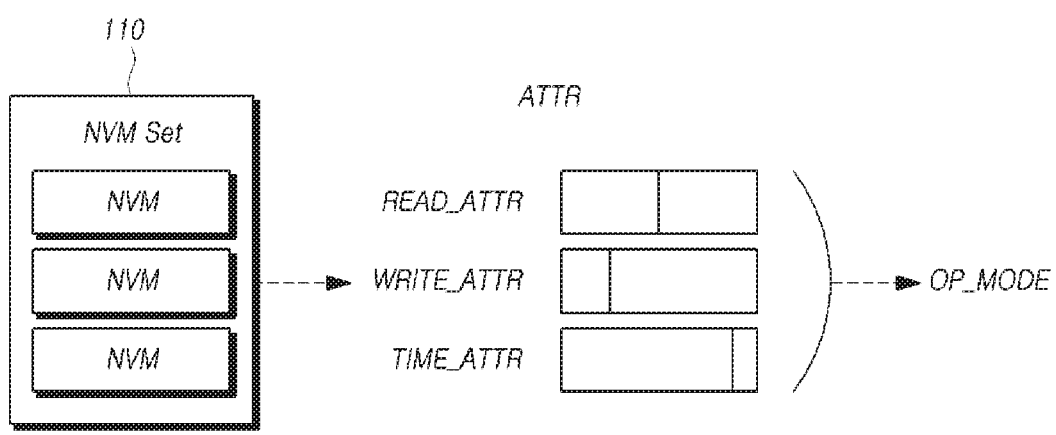
FIG. 6 is a diagram schematically illustrating attribute values for determining an operation mode of a nonvolatile memory set according to embodiments of the present disclosure.

FIG. 6 is a diagram schematically illustrating attribute values ATTR for determining the operation mode OP_MODE of a nonvolatile memory set 110 according to embodiments of the present disclosure.

The memory controller 120 may calculate attribute values ATTR for the nonvolatile memory set 110, and may determine an operation mode OP_MODE on the basis of the attribute values ATTR.

In this case, the attribute value for determining the operation mode OP_MODE of the nonvolatile memory set 110 may be a read-attribute value READ_ATTR, a write-attribute value WRITE_ATTR, or a time-attribute value TIME_ATTR.

The memory controller 120 may calculate a read-attribute value READ_ATTR, a write-attribute value WRITE_ATTR, and a time-attribute value TIME_ATTR for the nonvolatile memory set 110, and may determine the operation mode OP_MODE of the nonvolatile memory set 110 on the basis of one or more thereof.

The read-attribute value READ_ATTR, the write-attribute value WRITE_ATTR, and the time-attribute value TIME_ATTR may be defined in various ways.

For example, the read-attribute value READ_ATTR may be defined as the number of read operations that the memory controller 120 can execute while maintaining the operation mode OP_MODE to be the first operation mode OP_MODE_1. If the read-attribute value READ_ATTR is 100, the memory controller 120 may predict that a background operation (e.g., read-reclaim) on the nonvolatile memory set 110 will not be executed until the read operation on the nonvolatile memory set 110 is performed 100 times, that is, while staying in the first operation mode OP_MODE_1.

For example, the write-attribute value WRITE_ATTR may be defined as the number of write operations that the memory controller 120 can execute while maintaining the operation mode OP_MODE to be the first operation mode OP_MODE_1. For example, if the write-attribute value WRITE_ATTR is 50, the memory controller 120 may predict that a background operation (e.g., garbage collection) on the nonvolatile memory set 110 will not be performed until the write operation on the nonvolatile memory set 110 is performed 50 times, that is, while staying in the first operation mode OP_MODE_1.

For example, the time-attribute value TIME_ATTR may be defined as the time for the memory controller 120 to maintain the state in which the operation mode OP_MODE is the first operation mode OP_MODE_1. As an example, if the time-attribute value TIME_ATTR is 30 ms, the memory controller 120 may predict that a background operation on the nonvolatile memory set 110 will not be performed for 30 ms, that is, while staying in the first operation mode OP_MODE_1.

Meanwhile, the units of the read-attribute value READ_ATTR, the write-attribute value WRITE_ATTR, and the time-attribute value TIME_ATTR described above may be determined in various ways.

For example, the unit of the read-attribute value READ_ATTR may be the number of operations, or may be the size of data to be read (e.g., pages). The unit of the write-attribute value WRITE_ATTR may also be the number of operations, or may be the size of data to be written (e.g., pages). The unit of the time-attribute value TIME_ATTR may be a specific time value (e.g., ms/μs), or may be a specific periodic value (e.g., tick).

Figure 7:
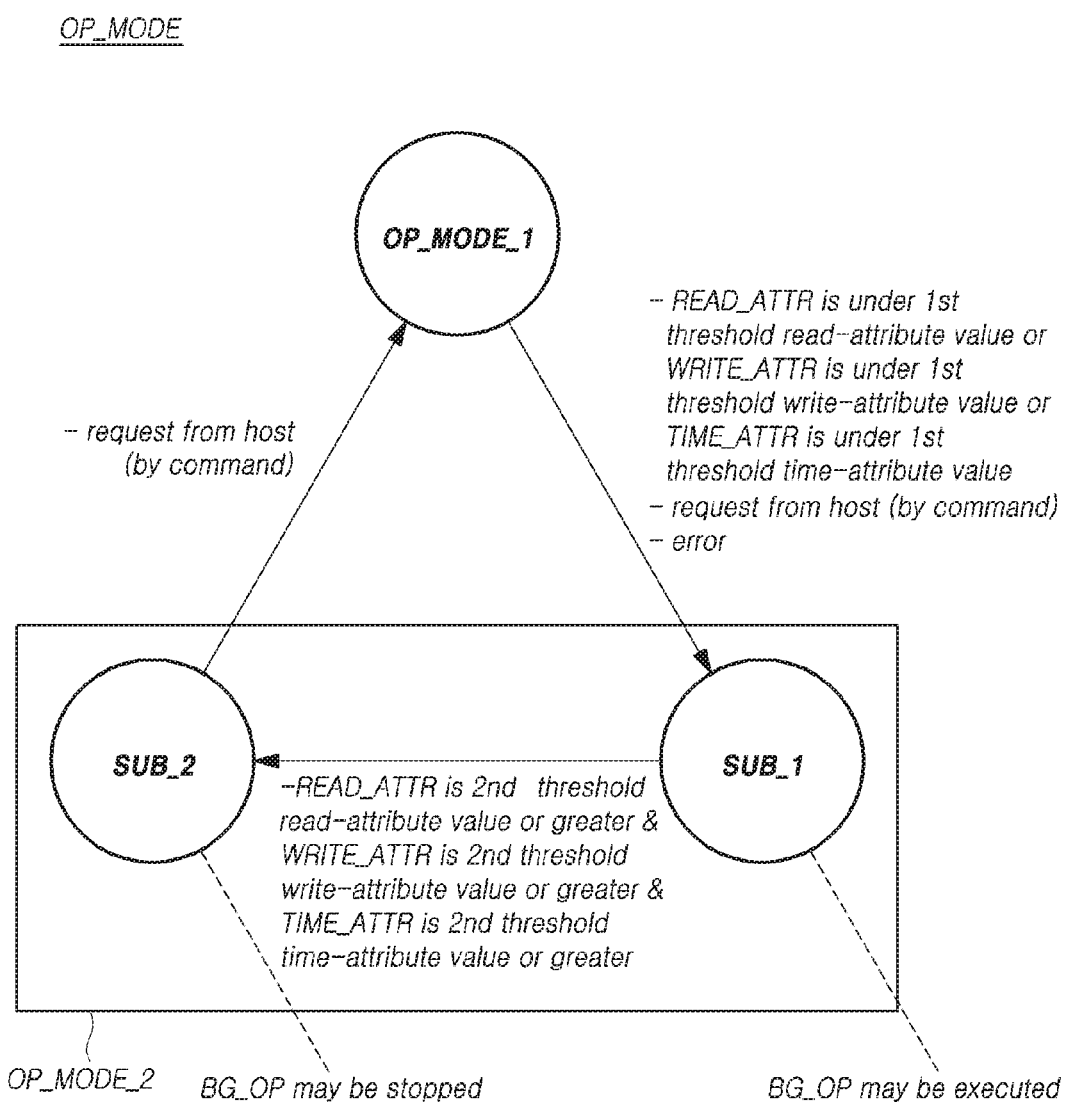
FIG. 7 is a state diagram illustrating switching of an operation mode for a nonvolatile memory set according to embodiments of the present disclosure.

FIG. 7 is a state diagram illustrating a change in the operation mode OP_MODE for a nonvolatile memory set 110 according to embodiments of the present disclosure.

First, the memory controller 120 may switch the operation mode OP_MODE from the first operation mode OP_MODE_1 to the second operation mode OP_MODE_2 in the following cases. For example, when the operation mode OP_MODE is the first operation mode OP_MODE_1, the memory controller 120 may switch the operation mode OP_MODE from the first operation mode OP_MODE_1 to the second operation mode OP_MODE_2 1) if a read-attribute value READ_ATTR is less than or equal to a first threshold read-attribute value, 2) if a write-attribute value WRITE_ATTR is less than or equal to a first threshold write-attribute value, or 3) a time-attribute value TIME_ATTR is less than or equal to a first threshold time-attribute value.

For example, if the read-attribute value READ_ATTR is less than or equal to a first threshold read-attribute value, the memory controller 120 may execute a read-reclaim operation on the nonvolatile memory set 110 to prevent read failure, and may switch the operation mode OP_MODE from the first operation mode OP_MODE_1 to the second operation mode OP_MODE_2 for the same purpose.

For example, if the write-attribute value WRITE_ATTR is less than or equal to a first threshold write-attribute value, the memory controller 120 may execute a garbage collection operation on the nonvolatile memory set 110 to secure a free memory block, and may switch the operation mode OP_MODE from the first operation mode OP_MODE_1 to the second operation mode OP_MODE_2 for the same purpose.

For example, if the time-attribute value READ_ATTR is less than or equal to a first time-attribute value, the memory controller 120 may determine that it is necessary to perform the background operation again because a long time has passed since executing the background operation, and may switch the operation mode OP_MODE from the first operation mode OP_MODE_1 to the second operation mode OP_MODE_2 for the same purpose.

As described above, if one of the read-attribute value READ_ATTR, the write-attribute value WRITE_ATTR, or the time-attribute value TIME_ATTR is exhausted, the memory controller 120 may determine that a background operation is required to be executed in order for the nonvolatile memory set 110 to operate normally later, and may thus switch the operation mode OP_MODE from the first operation mode OP_MODE_1 to the second operation mode OP_MODE_2.

As another example, if a command instructing to switch the operation mode OP_MODE to the second operation mode OP_MODE_2 is received from a host HOST, the memory controller 120 may also switch the operation mode OP_MODE from the first operation mode OP_MODE_1 to the second operation mode OP_MODE_2. In this case, the memory controller 120 may change the operation mode OP_MODE, regardless of the read-attribute value READ_ATTR, the write-attribute value WRITE_ATTR, or the time-attribute value TIME_ATTR.

As another example, if an error (e.g., runtime bad blocks, read failure, or write failure) occurs in the nonvolatile memory set 100, the memory controller 120 may switch the operation mode OP_MODE from the first operation mode OP_MODE_1 to the second operation mode OP_MODE_2.

In this case, the memory controller 120 may determine the cause of the corresponding error, and may determine that a background operation is required to be executed to process the corresponding error, thereby switching the operation mode OP_MODE to the second operation mode OP_MODE_2.

In this case, the memory controller 120 may further configure a sub state of the second operation mode OP_MODE_2. The sub state may be configured as one of a first sub state SUB_1 and a second sub state SUB_2. When the memory controller 120 switches the operation mode OP_MODE from the first operation mode OP_MODE_1 to the second operation mode OP_MODE_2, the sub state is preferentially configured as the first sub state SUB_1.

If the sub state is the first sub state SUB_1, the memory controller 120 cannot directly switch the operation mode OP_MODE from the second operation mode OP_MODE_2 to the first operation mode OP_MODE_1. The memory controller 120 executes a background operation when the sub state is the first sub state SUB_1. In addition, the memory controller 120 maintains the first sub state SUB_1 until the operation mode OP_MODE is ready to be switched to the first operation mode OP_MODE_1 as a result of the background operation.

On the other hand, if the sub state is the second sub state SUB_2, the memory controller 120 may switch the operation mode OP_MODE from the second operation mode OP_MODE_2 to the first operation mode OP_MODE_1.

If the operation mode OP_MODE is the second operation mode OP_MODE_2, and if the sub state is the second sub state SUB_2, the memory controller 120 may stop the currently running background operation in order to quickly switch the operation mode OP_MODE from the second operation mode OP_MODE_2 to the first operation mode OP_MODE_1. At this time, the stopped background operation may resume when the operation mode OP_MODE switches to the second operation mode OP_MODE_2 again after switching to the first operation mode OP_MODE_1.

If the operation mode OP_MODE of the memory controller 120 is the second operation mode OP_MODE_2, and if the sub state is the first sub state SUB_1, the memory controller 120 may be in the second sub state SUB_2 if set target conditions are satisfied.

The target conditions for switching the sub state from the first sub state SUB_1 to the second sub state SUB_2 when the operation mode OP_MODE of the memory controller 120 is the second operation mode OP_MODE_2 may be determined in various ways.

For example, when the operation mode OP_MODE of the memory controller 120 is the second operation mode OP_MODE_2, 1) if a read-attribute value READ_ATTR is greater than or equal to a second threshold read-attribute value, 2) if a write-attribute value WRITE_ATTR is greater than or equal to a second threshold write-attribute value, and 3) if a time-attribute value is greater than or equal to a second threshold time-attribute value, the memory controller 120 may be in the state in which the operation mode OP_MODE is ready to be switched from the second operation mode OP_MODE_2 to the first operation mode OP_MODE_1 (i.e., the second sub state SUB_2).

If a background operation is executed after the operation mode OP_MODE is changed to the second operation mode OP_MODE_2, the read-attribute value READ_ATTR, write-attribute value WRITE_ATTR, and time-attribute value TIME_ATTR may increase again.

For example, if the read-attribute value READ_ATTR is greater than or equal to the second threshold read-attribute value, the memory controller 120 may determine that the read operation is ready to be executed in the first operation mode OP_MODE_1 due to a read-reclaim operation.

For example, if the write-attribute value WRITE_ATTR is greater than or equal to the second threshold write-attribute value, the memory controller 120 may determine that the write operation is ready to be executed in the first operation mode OP_MODE_1 due to a garbage collection operation.

For example, if the time-attribute value TIME_ATTR is greater than or equal to the second threshold time-attribute value, the memory controller 120 may determine that the read operation or the write operation is ready to be executed in the first operation mode OP_MODE_1 because the background operation is executed for a set time or more.

As described above, the memory controller 120 may determine that the read or write operation is ready to be executed in the first operation mode OP_MODE_1 on the basis of the updated read-attribute value READ_ATTR, write-attribute value WRITE_ATTR, and time-attribute value TIME_ATTR. In this case, the memory controller 120 is in the state in which the operation mode OP_MODE is ready to be switched from the second operation mode OP_MODE_2 to the first operation mode OP_MODE_1.

However, the memory controller 120 is in the state in which the operation mode OP_MODE is ready to be switched from the second operation mode OP_MODE_2 to the first operation mode OP_MODE_1 only if all of the read-attribute value READ_ATTR, the write-attribute value WRITE_ATTR, and the time-attribute value TIME_ATTR satisfy the conditions.

For example, although the read-attribute value READ_ATTR is greater than or equal to the second threshold read-attribute value, if the write-attribute value WRITE_ATTR is less than the second threshold write-attribute value, the memory controller must maintain the operation mode OP_MODE as the second operation mode OP_MODE_2 because garbage collection, among the background operations, needs to be executed.

When the memory controller 120 is in the state in which the operation mode OP_MODE is ready to be switched from the second operation mode OP_MODE_2 to the first operation mode OP_MODE_1 as described above, if the memory controller 120 receives, from the host HOST, a command instructing to switch the operation mode OP_MODE to the first operation mode OP_MODE_1, the memory controller 120 may switch the operation mode OP_MODE from the second operation mode OP_MODE_2 to the first operation mode OP_MODE_1. That is, in this case, the memory controller 120 may switch the operation mode OP_MODE to the first operation mode OP_MODE_1 when an instruction is received from the host HOST, instead of automatically switching the operation mode OP_MODE to the first operation mode OP_MODE_1.

Hereinafter, an example of a specific method of determining the aforementioned attribute values ATTR (read-attribute values READ_ATTR/write-attribute values WRITE_ATTR/time-attribute values TIME_ATTR) by the memory controller 120 will be described in detail.

In this case, the memory controller 120 may separate the nonvolatile memory set 110 into one or more super memory blocks SBLK, and may calculate the aforementioned attribute values ATTR on the basis of the state of each super memory block SBLK.

Hereinafter, configuring a super memory block SBLK will be described with reference to FIG. 8, and obtaining a read-attribute value or a write-attribute value on the basis of the state of a super memory block SBLK included in the nonvolatile memory set 110 will be described with reference to FIGS. 9 through 16.

Figure 8:
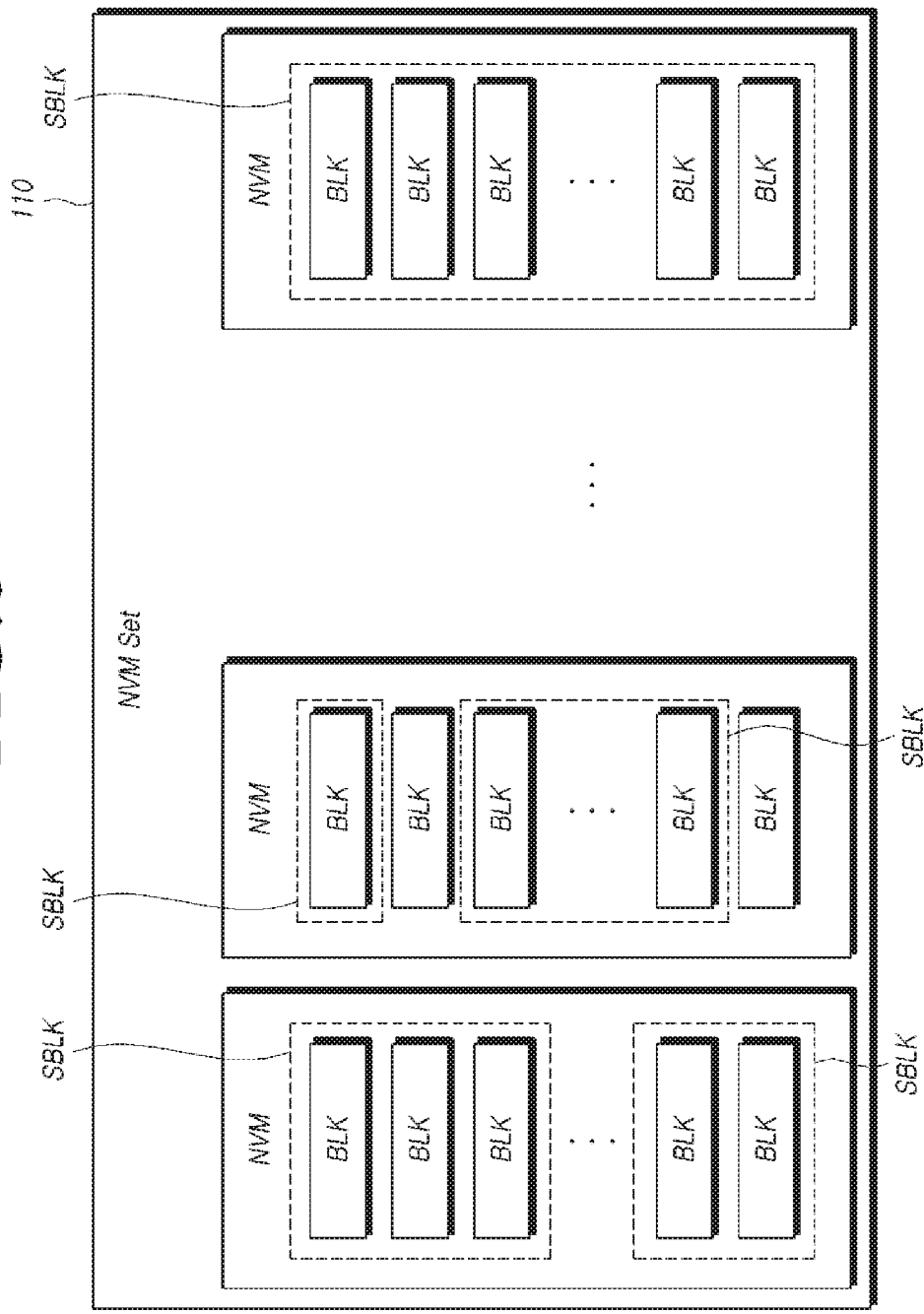
FIG. 8 is a diagram illustrating configuring a super memory block in a nonvolatile memory set according to embodiments of the present disclosure.

FIG. 8 is a diagram illustrating configuring a super memory block SBLK in a nonvolatile memory set 110 according to embodiments of the present disclosure.

The nonvolatile memory set 110 may include one or more super memory blocks SBLK.

Each of the super memory blocks SBLK may include one or more memory blocks BLK. Each of the memory blocks included in the super memory block SBLK may be included in any one of the nonvolatile memories (NVM) included in the nonvolatile memory set 110.

For all of the super memory blocks SBLK included in the nonvolatile memory set 110, the numbers of memory blocks BLK included in the respective super memory blocks SBLK may be the same or different. For example, as shown in FIG. 8, there may be super memory blocks SBLK including one, two, and three memory blocks BLK, respectively. However, all of the super memory blocks SBLK may have the same number of memory blocks BLK (e.g., three memory blocks).

In addition, the respective memory blocks BLK included in one super memory block SBLK may be included in the same nonvolatile memory (NVM) as shown in FIG. 8, or may be included in different nonvolatile memories (NVM).

Hereinafter, an example of a specific method of determining an read-attribute value READ_ATTR among the attributes ATTR by the memory controller 120 in the case of configuring one or more super memory blocks SBLK included in the nonvolatile memory set 110 as described with reference to FIGS. 9 to 12 above will be described.

For example, the read-attribute value READ_ATTR may be determined on the basis of the difference between 1) the maximum read-count value of each super memory block SBLK and 2) the threshold read-reclaim read-count value RR_THRESHOLD for the super memory block SBLK.

The maximum read-count value of the super memory block SBLK means a maximum value, among the read-count values for the memory blocks included in the corresponding super memory block SBLK.

The threshold read-reclaim read-count value RR_THRESHOLD for the super memory block SBLK means a threshold read-count value for triggering a read-reclaim operation on at least one of the memory blocks included in the corresponding super memory block SBLK. If the read-count value of at least one of the memory blocks included in the super memory block SBLK is equal to or greater than the threshold read-reclaim read-count value RR_THRESHOLD, a read-reclaim operation may be triggered on the corresponding super memory block SBLK.

Hereinafter, a method of obtaining a read-attribute value READ_ATTR will be described in detail with reference to FIGS. 9 and 10.

Figure 9:
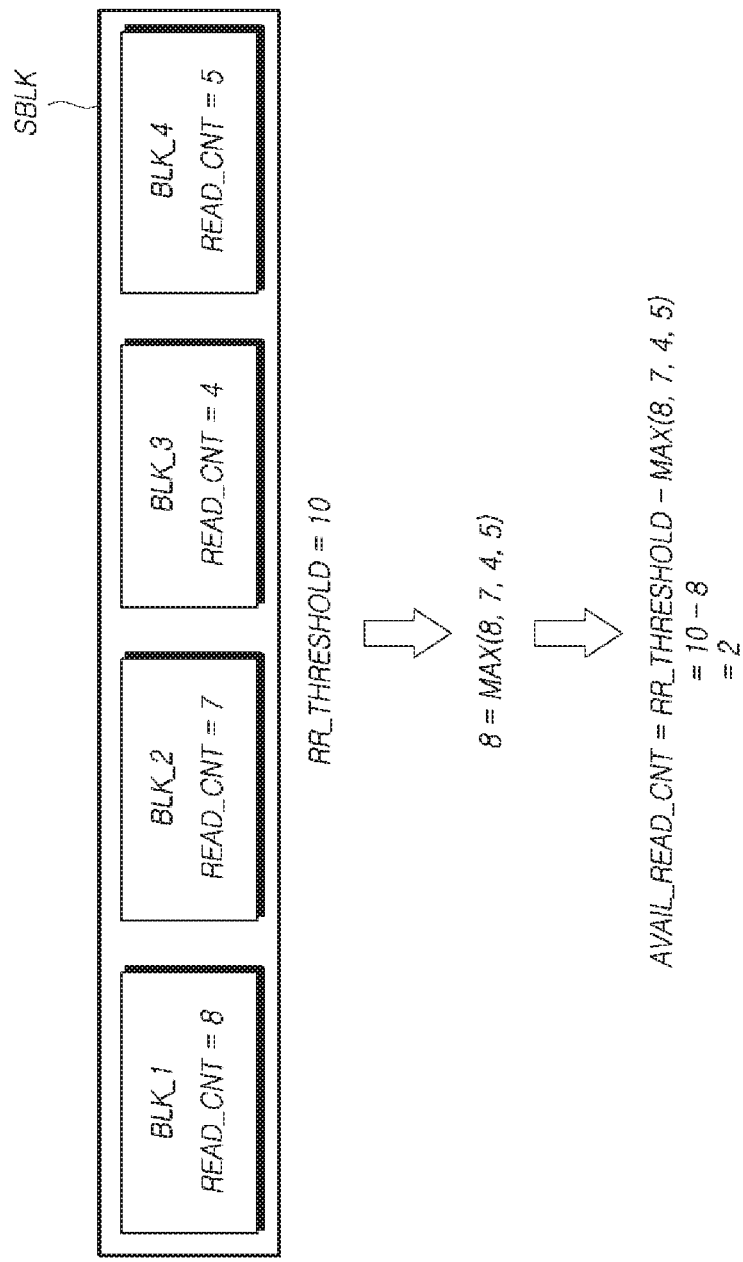
FIG. 9 is a diagram illustrating a method of calculating an available read-count value of a super memory block according to embodiments of the present disclosure.

FIG. 9 is a diagram illustrating a method of calculating an available read-count value AVAIL_READ_CNT of a super memory block SBLK according to embodiments of the present disclosure.

In FIG. 9, the super memory block SBLK includes four memory blocks BLK_1, BLK_2, BLK_3, and BLK_4. In this case, the read-count value READ_CNT of the memory block BLK_1 is 8, the read-count value READ_CNT of the memory block BLK_2 is 7, the read-count value READ_CNT of the memory block BLK_3 is 4, and the read-count value READ_CNT of the memory block BLK_4 is 5. In addition, the threshold read-reclaim read-count value RR_THRESHOLD is 10.

In this case, the maximum read-count value of the super memory block SBLK may be determined to be MAX (8, 7, 4, 5)=8.

In this case, an available read-count value AVAIL_READ_CNT may be determined to be 2, which is the difference between the threshold read-reclaim read-count value RR_THRESHOLD "10" and the maximum read-count value "8" of the super memory block SBLK.

In the worst case, if a read operation for the memory block BLK_1, among the memory blocks included in the super memory block SBLK, is executed tow more times, the read-count value READ_CNT of the memory block BLK_1 becomes 8+2=10, which is the same the threshold read-reclaim read-count value RR_THRESHOLD "10". In this case, a read-reclaim operation must be executed on the corresponding super memory block SBLK. On the other hand, if a read operation is performed on a memory block other than the memory block BLK_1, two or more read operations may be executed before the read-reclaim operation is executed. That is, this means that the read-reclaim operation is not executed on the super memory block SBLK until at least two read operations are executed.

The memory controller 120 may obtain an available read-count value AVAIL_READ_CNT for each super memory block included in the nonvolatile memory set 110, and may determine the read-attribute value READ_ATTR of the nonvolatile memory set 110 on the basis of the available read-count value AVAIL_READ_CNT.

FIG. 10 is a diagram illustrating obtaining a read-attribute value READ_ATTR for a nonvolatile memory set 110 by applying the method described in FIG. 9.

In FIG. 10, four super memory blocks SBLK #1, SBLK #2, SBLK #3, and SBLK #4 are included in the nonvolatile memory set 110. In addition, each super memory block includes three memory blocks BLK #1, BLK #2, and BLK #3. Further, the threshold read-reclaim read-count value RR_THRESHOLD is 10.

In FIG. 10, read-count values READ_CNT of the memory blocks BLK #1, BLK #2, and BLK #3 of the super memory block SBLK #1 are 6, 0, and 0, respectively. In this case, the maximum read-count value MAX_READ_CNT of the super memory block SBLK #1 becomes MAX (6, 0, 0)=6, and the available read-count value AVAIL_READ_CNT of the super memory block SBLK #1 is 10-6=4.

When the read-count values READ_CNT of the memory blocks BLK #1, BLK #2, and BLK #3 of the super memory block SBLK #2 are 8, 8, and 8, respectively, the maximum read-count value MAX_READ_CNT of the super memory block SBLK #2 becomes MAX (8, 8, 8)=8, and the available read-count value AVAIL_READ_CNT of the super memory block SBLK #2 is 10-8=2.

When the read-count values READ_CNT of the memory blocks BLK #1, BLK #2, and BLK #3 of the super memory block SBLK #3 are 9, 4, and 5, respectively, the maximum read-count value MAX_READ_CNT of the super memory block SBLK #3 becomes MAX (9, 4, 5)=9, and the available read-count value AVAIL_READ_CNT of the super memory block SBLK #3 is 10-9=1.

When the read-count values READ_CNT of the memory blocks BLK #1, BLK #2, and BLK #3 of the super memory block SBLK #4 are 2, 2, and 2, respectively, the maximum read-count value MAX_READ_CNT of the super memory block SBLK #4 becomes MAX (2, 2, 2)=2, and the available read-count value AVAIL_READ_CNT of the super memory block SBLK #4 is 10-2=8.

As described above, if the available read-count values AVAIL_READ_CNT for the respective read-count values of the four super memory blocks SBLK #1, SBLK #2, SBLK #3, and SBLK #4 are determined, the memory controller 120 may determine a read-attribute value READ_ATTR on the basis of the same. For example, the memory controller 120 may determine the minimum value (i.e., MIN(4, 2, 1, 8)=1) of the determined available read-count values AVAIL_READ_CNT as a read-attribute value READ_ATTR.

The read-attribute value READ_ATTR of the value 1 means that operation mode can be changed after the read operation on the nonvolatile memory set 110 is performed once (in worst case), while staying in the first operation mode OP_MODE_1.

This is intended to take into consideration the situation in which the read operation is continuously executed only on the memory block BLK #1, which has the highest read-count value READ_CNT, of the super memory block SBLK #3 in the worst case.

The above method considering the worst case is able to prevent the host HOST from misjudging that a read operation is still ready to be executed in the first operation mode OP_MODE_1 at the time at which the memory controller 120 must perform a read-reclaim operation.

However, when using the above method, in most cases, the operation mode OP_MODE is switched from the first operation mode OP_MODE_1 to the second operation mode OP_MODE_2 before the time at which the memory controller 120 must perform the read-reclaim operation. This is due to the fact that the read operation may not necessarily be performed on the memory block having the highest read-count value READ_CNT.

In this case, the time during which the operation mode OP_MODE is the first operation mode OP_MODE_1 (i.e., the time capable of providing high QoS to the host HOST) may be reduced. Therefore, there is a possibility of the host HOST determining the performance of the memory system 100 to be low. In addition, since the frequency of switching the operation mode OP_MODE increases, performance loss that occurs when the memory system 100 processes the switching of the operation mode OP_MODE may increase.

Therefore, the memory controller 120 may determine the number of read operations predicted before the read-reclaim operation is executed by determining a change in the overall read-count value, instead of considering only the worst case.

Using this method, the predicted number of read operations increases, compared to the case of considering only the worst case, so that the time during which the operation mode OP_MODE is the first operation mode OP_MODE_1 (i.e., the time capable of providing high QoS to the host HOST) may be increased. In addition, since the frequency of switching the operation mode OP_MODE is minimized, the performance loss that occurs when the memory system 100 processes the switching of the operation mode OP_MODE may also be minimized.

Hereinafter, another example of a method of determining a read-attribute value READ_ATTR by a memory controller 120 will be described.

The read-attribute value READ_ATTR may be determined on the basis of 1) the maximum read-count value for each super memory block, 2) a sum read-count value for each super memory block, and 3) a threshold read-reclaim read-count value for the super memory block.

In this case, the sum read-count value for the super memory block means the sum of the read-count values of respective memory blocks included in the super memory block.

Hereinafter, another method of obtaining a read-attribute value READ_ATTR will be described in detail with reference to FIGS. 11 and 12.

Figure 11:
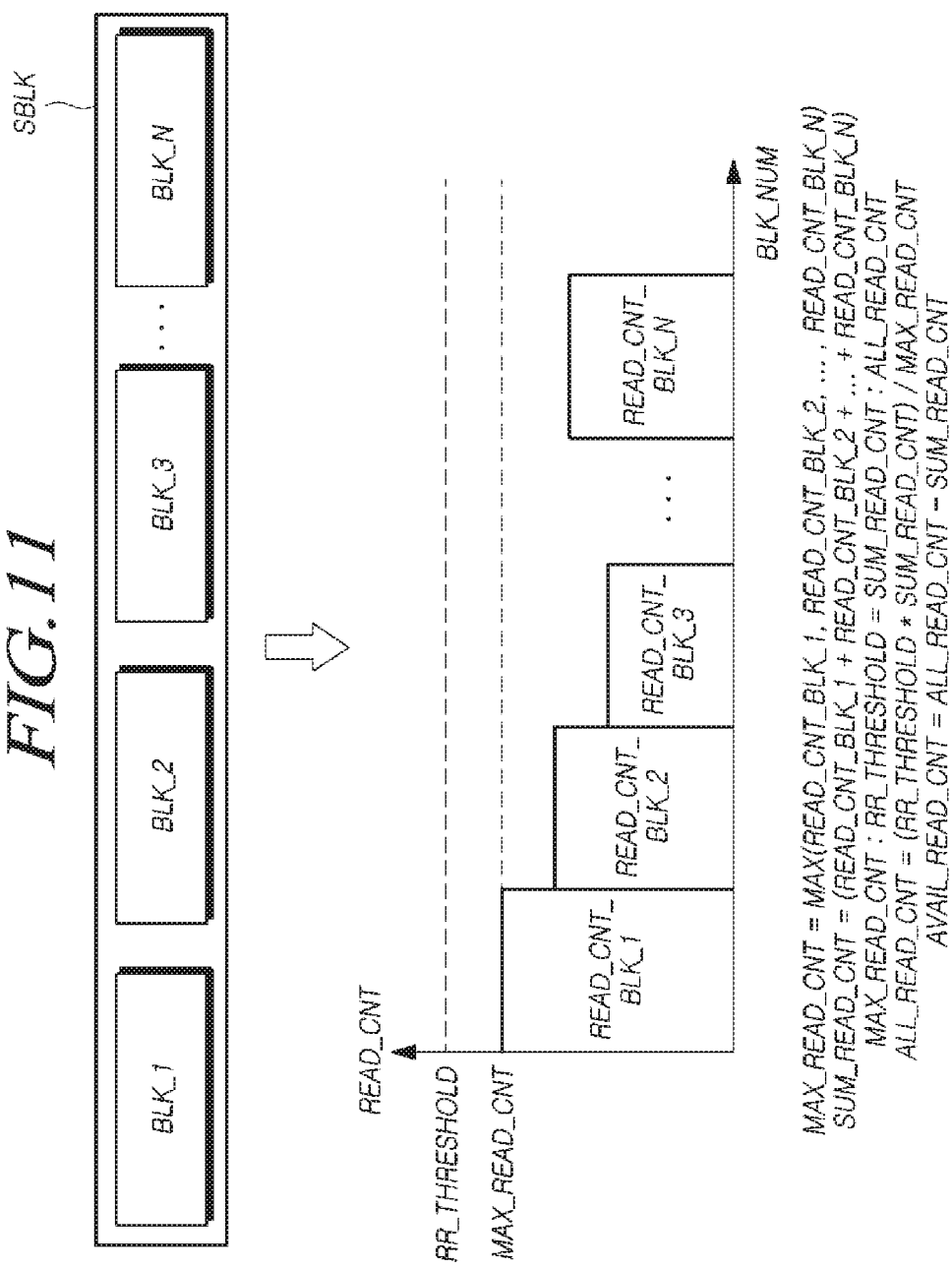
FIG. 11 is a diagram illustrating a method of calculating an available read-count value of a super memory block according to embodiments of the present disclosure.

FIG. 11 is a diagram illustrating another method of calculating an available read-count value of a super memory block according to embodiments of the present disclosure.

In FIG. 11, N memory blocks BLK_1, BLK_2, BLK_3, . . . , and BLK_N are included in the super memory block SBLK. In addition, read-count values READ_CNT of the N memory blocks BLK_1, BLK_2, BLK_3, . . . , and BLK_N are assumed to be READ_CNT_BLK_1, READ_CNT_BLK_2, READ_CNT_BLK_3, . . . , and READ_CNT_BLK_N, respectively.

In this case, the maximum read-count value MAX_READ_CNT of the super memory block SBLK may be determined to be MAX (READ_CNT_BLK_1, READ_CNT_BLK_2, . . . , READ_CNT_BLK_N).

The sum read-count value SUM_READ_CNT for the super memory block SBLK may be determined to be (READ_CNT_BLK_1, READ_CNT_BLK_2, . . . , READ_CNT_BLK_N).

In this case, the patterns by which the read-count values of the memory blocks BLK_1, BLK_2, BLK_3, . . . , and BLK_N included in the super memory block SBLK change are the same over time. That is, the read-count value of any one of the memory blocks included in the super memory block SBLK increases uniformly over time, instead of increasing rapidly at a specific time.

In this case, the ratio of 1) the maximum read-count value MAX_READ_CNT of the current super memory block SBLK to 2) the sum read-count value SUM_READ_CNT of the current super memory block SBLK is the same as the ratio of 3) a threshold read-reclaim read-count value RR_THRESHOLD to 4) a sum read-count value ALL_READ_CNT for the super memory block SBLK when the maximum read-count value MAX_READ_CNT for the super memory block SBLK is a threshold read-reclaim read-count value RR_THRESHOLD.

This may be expressed as the following equation.

MAX_READ_CNT:
  RR_THRESHOLD=SUM_READ_CNT:ALL_
  READ_CNT

ALL_READ_CNT)=
  (RR_THRESHOLD*SUM_READ_CNT)/
  MAX_READ_CNT

On the basis of this, the available read-count AVAIL_READ_CNT for the super memory block SBLK may be determined as follows.

AVAIL_READ_CNT=ALL_READ_CNT−SUM_
  READ_CNT

FIG. 12 is a diagram illustrating obtaining a read-attribute value for a nonvolatile memory set by applying the method described with reference to FIG. 11.

In FIG. 12, four super memory blocks SBLK #1, SBLK #2, SBLK #3, and SBLK #4 are included in a nonvolatile memory set 110. In addition, each of the super memory blocks includes three memory blocks BLK #1, BLK #2, and BLK #3. The threshold read-reclaim read-count value RR_THRESHOLD is 10.

In FIG. 12, the read-count values READ_CNT of the memory blocks BLK #1, BLK #2, and BLK #3 of the super memory block SBLK #1 are 6, 0, and 0, respectively. In this case, the maximum read-count value MAX_READ_CNT of the super memory block SBLK #1 becomes MAX (6, 0, 0)=6, and the sum read-count value SUM_READ_CNT thereof becomes 6+0+0=6. The sum read-count value ALL_READ_CNT for the super memory block SBLK is (10*6)/6=10 when the maximum read-count value MAX_READ_CNT for the super memory block SBLK #1 is a threshold read-reclaim read-count value RR_THRESHOLD.

Therefore, the available read-count value AVAIL_READ_CNT for the super memory block SBLK #1 may be determined to be 10−6=4.

When the read-count values READ_CNT of the memory blocks BLK #1, BLK #2, and BLK #3 of the super memory block SBLK #2 are 8, 8, and 8, respectively, the maximum read-count value MAX_READ_CNT of the super memory block SBLK #2 becomes MAX (8, 8, 8)=8, and the sum read-count value SUM_READ_CNT thereof becomes 8+8+8=24. The sum read-count value ALL_READ_CNT for the super memory block SBLK is (10*24)/8=30 when the maximum read-count value MAX_READ_CNT for the super memory block SBLK #2 is a threshold read-reclaim read-count value RR_THRESHOLD.

Therefore, the available read-count value AVAIL_READ_CNT for the super memory block SBLK #2 may be determined to be 30−24=6.

When the read-count values READ_CNT of the memory blocks BLK #1, BLK #2, and BLK #3 of the super memory block SBLK #3 are 9, 4, and 5, respectively, the maximum read-count value MAX_READ_CNT of the super memory block SBLK #3 becomes MAX (9, 4, 5)=9, and the sum read-count value SUM_READ_CNT thereof becomes 9+4+5=18. The sum read-count value ALL_READ_CNT for the super memory block SBLK is (10*18)/9=20 when the maximum read-count value MAX_READ_CNT for the super memory block SBLK #2 is a threshold read-reclaim read-count value RR_THRESHOLD.

Therefore, the available read-count value AVAIL_READ_CNT for the super memory block SBLK #3 may be determined to be 20−18=2.

When the read-count values READ_CNT of the memory blocks BLK #1, BLK #2, and BLK #3 of the super memory block SBLK #4 are 2, 2, and 2, respectively, the maximum read-count value MAX_READ_CNT of the super memory block SBLK #4 becomes MAX (2, 2, 2)=2, and the sum read-count value SUM_READ_CNT thereof becomes 2+2+2=6. The sum read-count value ALL_READ_CNT for the super memory block SBLK is (10*6)/2=30 when the maximum read-count value MAX_READ_CNT for the super memory block SBLK #2 is a threshold read-reclaim read-count value RR_THRESHOLD.

Therefore, the available read-count value AVAIL_READ_CNT for the super memory block SBLK #4 may be determined to be 30−6=24.

If the available read-count values AVAIL_READ_CNT of the four super memory blocks SBLK #1, SBLK #2, SBLK #3, and SBLK #4 are determined as described above, the memory controller 120 may determine a read-attribute value READ_ATTR on the basis of the same. For example, the memory controller 120 may determine the minimum value of the determined available read-count values AVAIL_READ_CNT (i.e., MIN (4, 6, 2, 24)=2) to be a read-attribute value READ_ATTR.

If the read-attribute value READ_ATTR is determined according to the method described with reference to FIGS. 9 to 12, the memory controller 120 may determine whether or not to execute a background operation according to the read-attribute value READ_ATTR. For example, if the read-attribute value READ_ATTR is less than or equal to zero, the memory controller 120 may switch the operation mode OP_MODE to the second operation mode OP_MODE_2, and may execute a read-reclaim operation.

In this case, the memory controller 120 may simultaneously execute the read-reclaim operation and an operation of processing a read command received from the host HOST. In this case, the memory controller 120 is required to secure appropriate read bandwidth for each operation. Read bandwidth refers to the maximum size of data that can be read per unit time. For example, if the read bandwidth is 10 MB/s, the memory controller can read up to 10 MB of data per second. Hereinafter, this will be described in detail with reference to FIG. 13.

Figure 13:
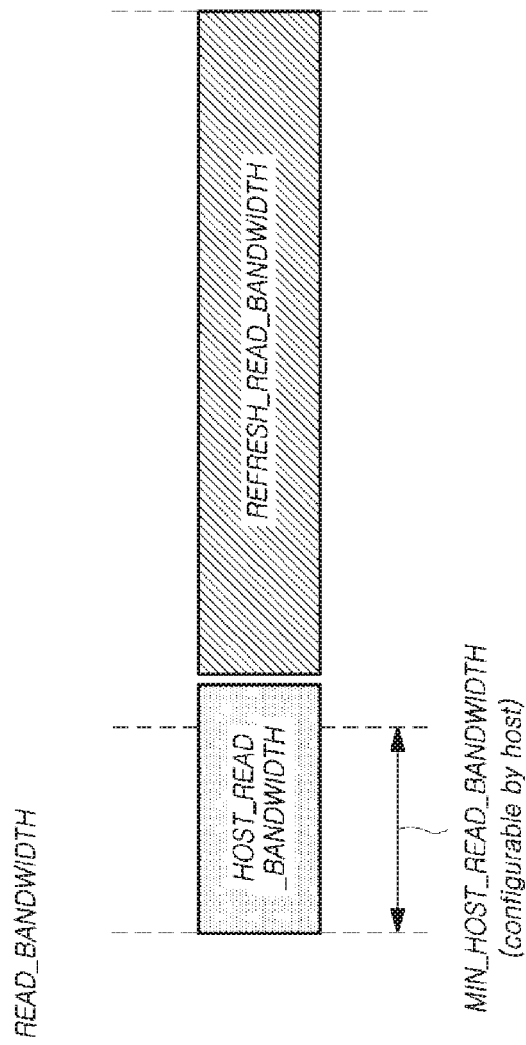
FIG. 13 is a diagram schematically illustrating a bandwidth for a read operation according to embodiments of the present disclosure.

FIG. 13 is a diagram schematically illustrating a bandwidth for a read operation according to embodiments of the present disclosure.

Referring to FIG. 13, when the operation mode OP_MODE is the second operation mode OP_MODE_2, if a read-reclaim operation is being executed on the nonvolatile memory set 110, the memory controller 120 may maintain a minimum read bandwidth MIN_HOST_READ_BANDWIDTH for processing a read operation from the host HOST.

When the memory controller 120 executes a read-reclaim operation in the second operation mode OP_MODE_2, the memory controller 120 may use most of the read bandwidth READ_BANDWIDTH in order to read data to be a target of the read-reclaim operation in the nonvolatile memory set 110.

In this case, a read-reclaim read bandwidth REFRESH_READ_BANDWIDTH for an operation of reading data to be a target of the read-reclaim operation in the nonvolatile memory set 110 may increase significantly. As a result, the memory controller 120 may not secure the bandwidth required for processing the read command received from the host HOST (i.e., a host read bandwidth HOST_READ_BANDWIDTH). In this case, the memory controller 120 may not properly process the read command received from the host HOST.

Therefore, the memory controller 120 may maintain the minimum read bandwidth MIN_HOST_READ_BANDWIDTH for executing the read operation from the host HOST even while performing the read-reclaim operation on the nonvolatile memory set 110, thereby processing the read command received from the host HOST while the read-reclaim operation is being performed inside the memory system 100.

Meanwhile, the minimum read bandwidth MIN_HOST_READ_BANDWIDTH value may be expressed as the ratio of the host read bandwidth HOST_READ_BANDWIDTH to the read-reclaim read bandwidth REFRESH_READ_BANDWIDTH (e.g., 20:1), instead of an absolute bandwidth value.

Meanwhile, the minimum read bandwidth MIN_HOST_READ_BANDWIDTH value may be configured by the host HOST, instead of being maintained at a fixed value.

In the above drawings, a method of determining a read-attribute value READ_ATTR among the aforementioned attribute values ATTR by the memory controller 120 in the case of configuring one or more super memory blocks SBLK included in the nonvolatile memory set 110 has been described.

Hereinafter, a method of determining a write-attribute value WRITE_ATTR among the aforementioned attribute values ATTR by the memory controller 120 in the case of configuring one or more super memory blocks SBLK included in the nonvolatile memory set 110 will be described with reference to FIGS. 14 to 16.

Figure 14:
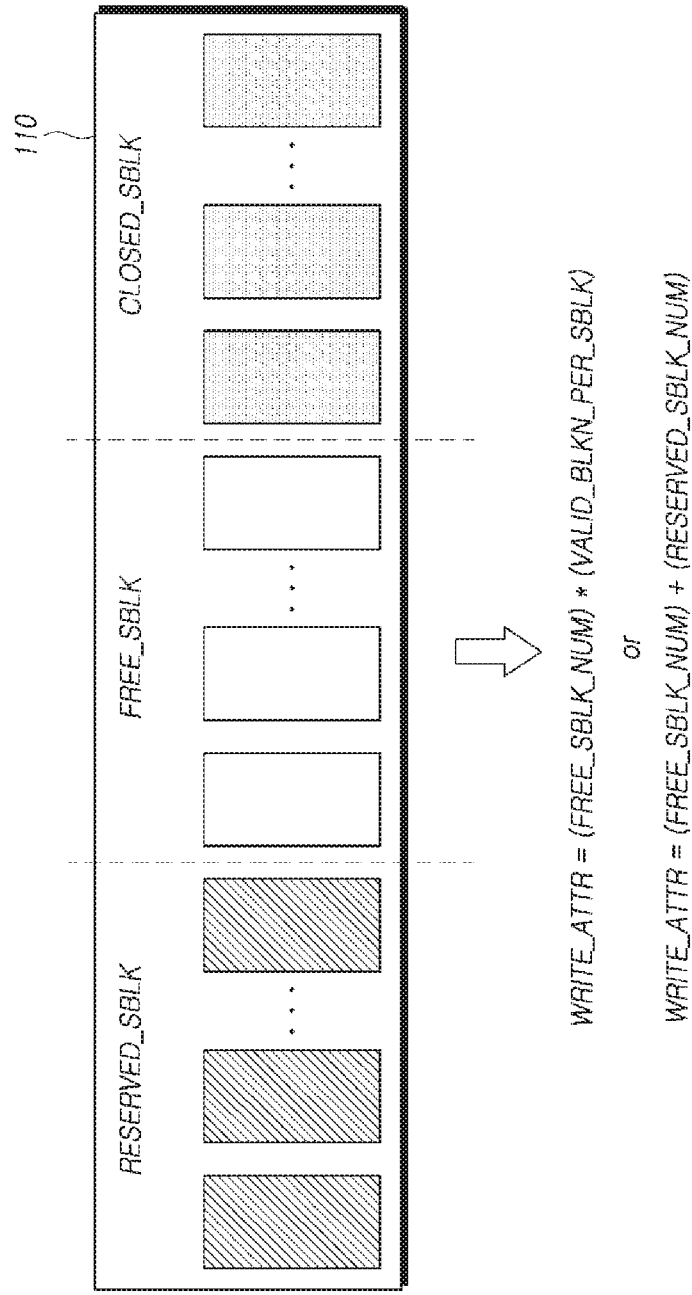
FIG. 14 is a diagram illustrating obtaining a write-attribute value for a nonvolatile memory set according to embodiments of the present disclosure.

FIG. 14 is a diagram illustrating obtaining a write-attribute value WRITE_ATTR for a nonvolatile memory set 110 according to embodiments of the present disclosure.

First, super memory blocks included in the nonvolatile memory set 110 may be roughly classified into reserved super memory block RESERVED_SBLK, free super memory blocks FREE_SBLK, and closed super memory blocks CLOSED_SBLK.

The reserved super memory blocks RESERVED_SBLK are super memory blocks replacing some of the super memory blocks that currently store data when some of the super memory blocks are required to be replaced due to the occurrence of bad memory blocks or problems such as read failure or write failure.

The reserved super memory block RESERVED_SBLK may be determined in various ways. For example, the reserved super memory blocks RESERVED_SBLK may include a memory blocks existing in the OP area. Meanwhile, the memory controller 120 may determine the number of reserved super memory blocks RESERVED_SBLK, among the super memory blocks included in the nonvolatile memory set 110, on the basis of a set policy (e.g., ten or more).

A free super memory block FREE_SBLK is a super memory block in which data is ready to be written.

A closed super memory block CLOSED_SBLK is a super memory block in which data has already been written, so that new data cannot be written until the data is erased.

The memory controller 120 may determine a write-attribute value WRITE_ATTR in various ways on the basis of the number of reserved super memory blocks RESERVED_SBLK, the number of free super memory blocks FREE_SBLK, and the number of closed super memory blocks CLOSED_SBLK.

For example, the write-attribute value WRITE_ATTR may be determined on the basis of the number FREE_SBLK_NUM of free super memory blocks FREE_SBLK among the super memory blocks. The write-attribute value WRITE_ATTR may be determined by multiplying the number FREE_SBLK_NUM of free super memory blocks FREE_SBLK by the number of valid memory blocks VALID_BLKN_PER_SBLK included in each super memory block. If the number of free super memory blocks FREE_SBLK is 5, and if the number of valid memory blocks VALID_BLKN_PER_SBLK included in each super memory block is 10, the write-attribute value WRITE_ATTR may be determined to be 5*10=50.

As another example, the write-attribute value WRITE_ATTR may be determined on the basis of the sum of the number FREE_SBLK_NUM of free super memory blocks FREE_SBLK and the number RESERVED_SBLK_NUM of reserved super memory blocks RESERVED_SBLK. If the number FREE_SBLK_NUM of free super memory blocks FREE_SBLK is 6, and if the number RESERVED_SBLK_NUM of reserved super memory blocks RESERVED_SBLK is 10, the write-attribute value WRITE_ ATTR may be determined to be 10+6=16.

On the basis of the write-attribute value WRITE_ATTR determined as described above, the memory controller 120 may perform garbage collection in the second operation mode OP_MODE_2 if the garbage collection is required. In addition, if the write-attribute value WRITE_ATTR is restored such that the write operation is ready to be executed in the first operation mode OP_MODE_1 due to the garbage collection, the memory controller 120 may stop the garbage collection.

Hereinafter, a process in which the memory controller 120 performs garbage collection when the write-attribute value WRITE_ATTR is determined on the basis of the sum of the number FREE_SBLK_NUM of free super memory blocks FREE_SBLK and the number RESERVED_SBLK_NUM of reserved super memory blocks RESERVED_SBLK will be described with reference to flowcharts in FIGS. 15 and 16.

Figure 15:
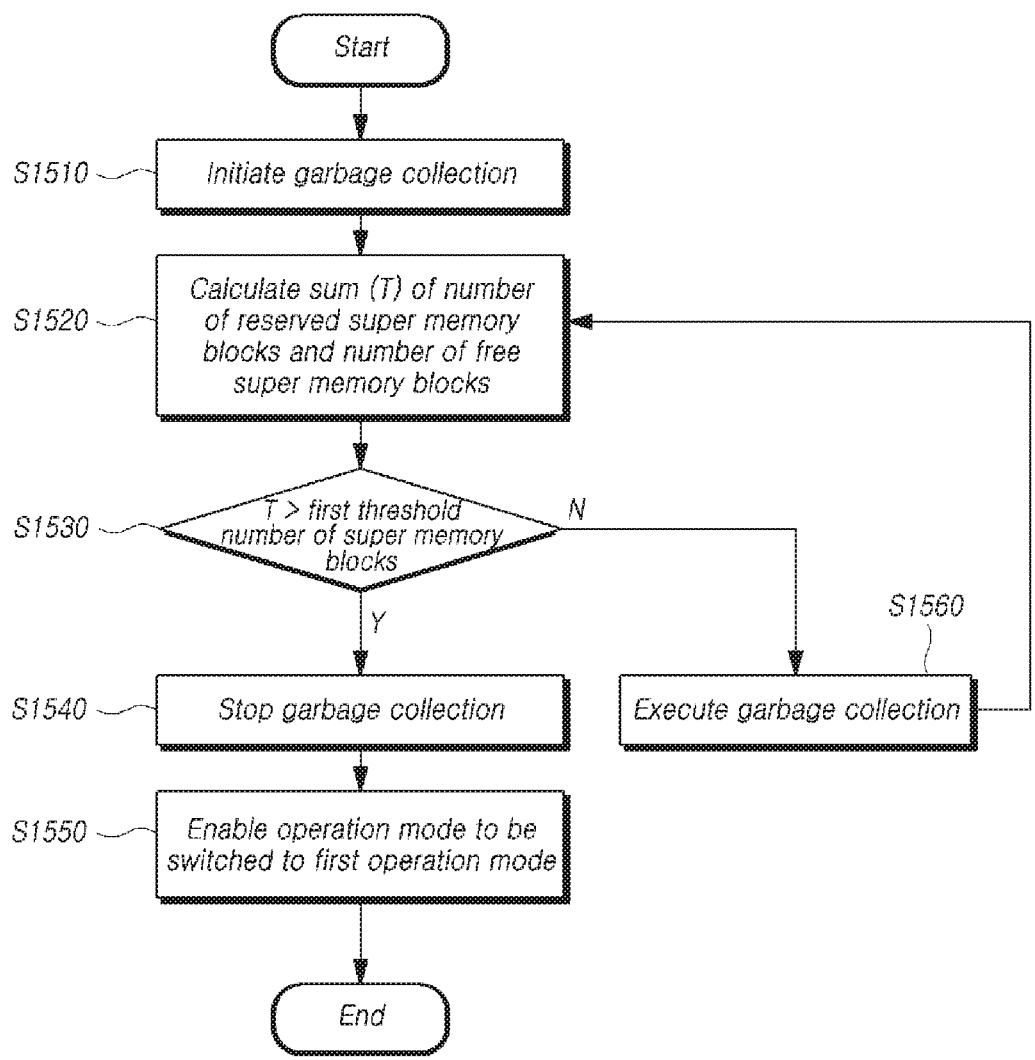
FIG. 15 is a flowchart illustrating a process in which a memory controller performs garbage collection according to embodiments of the present disclosure.

FIG. 15 is a flowchart illustrating a process in which a memory controller 120 performs garbage collection according to embodiments of the present disclosure.

If it is determined that garbage collection is required because the write-attribute value WRITE_ATTR becomes less than or equal to a first threshold write-attribute value, the memory controller 120 may initiate garbage collection (S1510). In this case, the memory controller 120 may switch the operation mode OP_MODE to the second operation mode OP_MODE_2.

When the operation mode OP_MODE is the second operation mode OP_MODE_2, the memory controller 120 may calculate the sum T of 1) the number of reserved super memory blocks RESERVED_SBLK and 2) the number of free super memory blocks FREE_SBLK, which are included in the nonvolatile memory set 110 (S1520).

The memory controller 120 determines whether or not the value T calculated in step S1520 is greater than a first threshold number of super memory blocks (S1530).

If the value T is greater than the first threshold number of super memory blocks ("Y" in S1530), the memory controller 120 may switch the operation mode OP_MODE to the first operation mode OP_MODE_1. To this end, the memory controller 120 stops the currently executed garbage collection (S1540) and enables the operation mode OP_MODE to be switched to the first operation mode OP_MODE_1 (S1550).

However, as described above, the memory controller 120 may switch the operation mode OP_MODE to the first operation mode OP_MODE_1 only when a command instructing to switch the operation mode OP_MODE to the first operation mode OP_MODE_1 is received from the host HOST, as described above.

On the other hand, if the value T is less than or equal to the first threshold number of super memory blocks ("N" in S1530), this means that additional free super memory blocks FREE_SBLK need to be secured in order to switch the operation mode OP_MODE to the first operation mode OP_MODE_1. Therefore, the memory controller 120 may execute garbage collection (S1560) to secure free super memory blocks, and may then calculate the value T again in step S1520.

Figure 16:
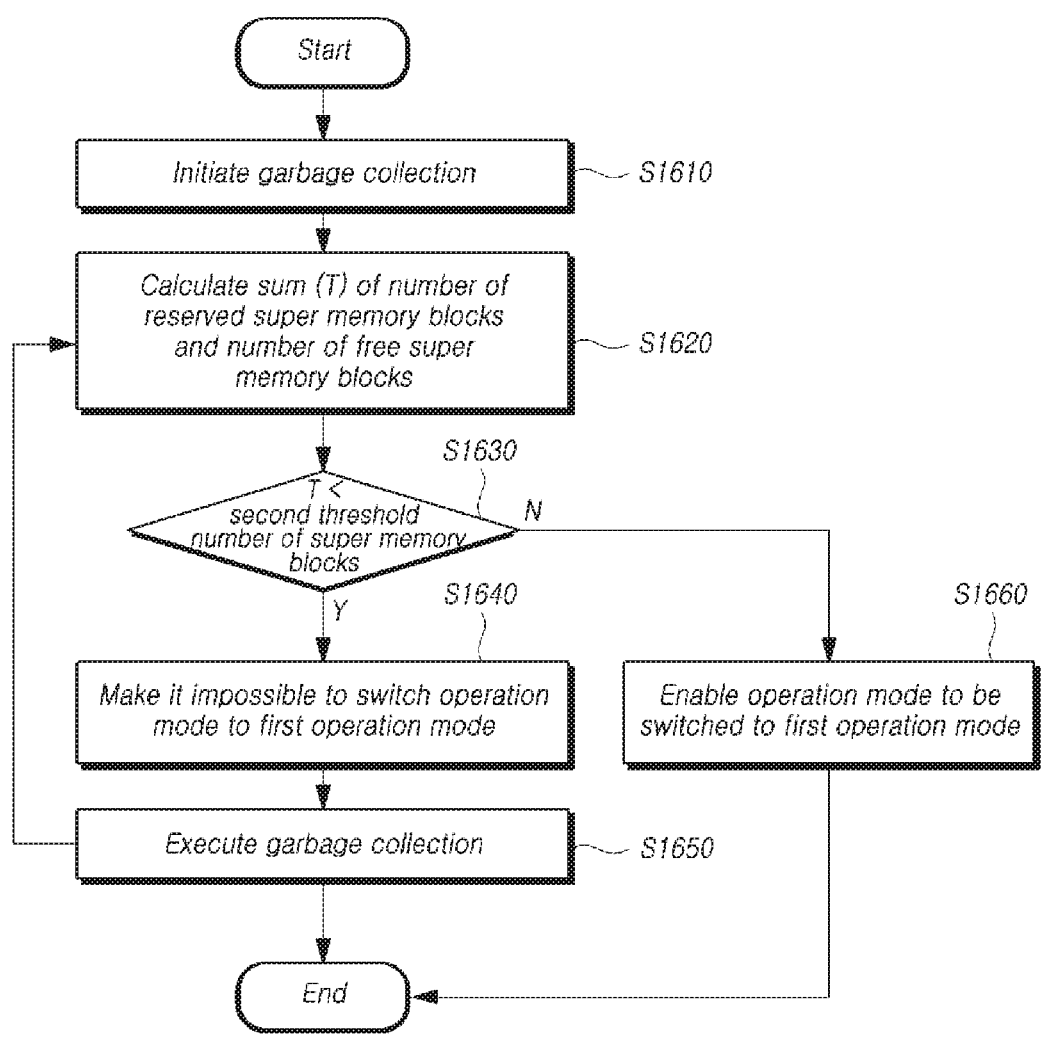
FIG. 16 is a flowchart illustrating another process in which a memory controller performs garbage collection according to embodiments of the present disclosure.

FIG. 16 is a flowchart illustrating another process in which a memory controller 120 performs garbage collection according to embodiments of the present disclosure.

If it is determined that garbage collection is required because the write-attribute value WRITE_ATTR becomes less than or equal to a first threshold write-attribute value, the memory controller 120 may initiate garbage collection (S1610). In this case, the memory controller 120 may switch the operation mode OP_MODE to the second operation mode OP_MODE_2.

When the operation mode OP_MODE is the second operation mode OP_MODE_2, the memory controller 120 may calculate the sum T of 1) the number of reserved super memory blocks RESERVED_SBLK and 2) the number of free super memory blocks FREE_SBLK, which are included in the nonvolatile memory set 110 (S1620).

The memory controller 120 determines whether or not the value T calculated in step S1620 is less than a second threshold number of super memory blocks (S1630).

If the value T is less than the second threshold number of super memory blocks ("Y" in S1630), the memory controller 120 may make it impossible to switch the operation mode OP_MODE to the first operation mode OP_MODE_1 (S1640). That is, in this case, even if the host HOST transmits, to the memory controller 120, a command instructing to switch the operation mode OP_MODE to the first operation mode OP_MODE_1, the memory controller 120 does not switch the operation mode OP_MODE to the first operation mode OP_MODE_1.

After step S1640 is performed, the memory controller 120 may execute garbage collection to secure free super memory blocks (S1650), and may calculate a value T again in step S1620.

On the other hand, if the value T is greater than or equal to the second threshold number of super memory blocks ("N" in S1630), the memory controller 120 may switch the operation mode OP_MODE to the first operation mode OP_MODE_1 (S1660). In this case, if a command instructing to switch the operation mode OP_MODE to the first operation mode OP_MODE_1 is received from the host HOST, the memory controller 120 may switch the operation mode OP_MODE to the first operation mode OP_MODE_1.

Figure 17:
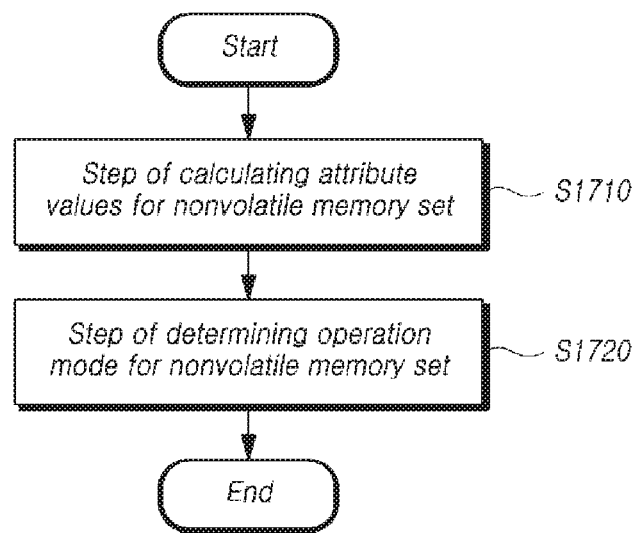
FIG. 17 is a flowchart illustrating a method of operating a memory controller according to embodiments of the present disclosure.

FIG. 17 is a flowchart illustrating a method of operating a memory controller 120 according to embodiments of the present disclosure.

The operation method of the memory controller 120 may include a step of calculating an attribute value for the nonvolatile memory set 110 (S1710). In this case, the attribute value may be 1) a read-attribute value READ_ATTR, 2) a write-attribute value WRITE_ATTR, and 3) a time-attribute value TIME_ATTR.

The operation method of the memory controller 120 may include a step of determining an operation mode OP_MODE of the nonvolatile memory set 110 on the basis of at least one of 1) the read-attribute value READ_ATTR, 2) the write-attribute value WRITE_ATTR, and 3) the time-attribute value TIME_ATTR (S1720).

In step S1720, the memory controller 120 may determine the operation mode OP_MODE of the nonvolatile memory set 110 in various ways.

For example, as described with reference to FIG. 7, the memory controller 120 may switch the operation mode OP_MODE from the first operation mode OP_MODE_1 to the second operation mode OP_MODE_2 1) if the read-attribute value READ_ATTR is less than or equal to a first threshold read-attribute value, 2) if the write-attribute value WRITE_ATTR is less than or equal to a first threshold write-attribute value, or 3) if the time-attribute value TIME_ATTR is less than or equal to a first threshold time-attribute value when the operation mode OP_MODE is the first operation mode OP_MODE_1.

Meanwhile, in operation S1720, if set target conditions are satisfied when the operation mode OP_MODE is the second operation mode OP_MODE_2, the memory controller 120 may stop the background operation on the nonvolatile memory set, and may switch to the state in which the operation mode OP_MODE is ready to be switched to the first operation mode OP_MODE_1.

In this case, as described with reference to FIG. 7, the target conditions may be 1) that the read-attribute value READ_ATTR is greater than or equal to a second threshold read-attribute value, 2) that the write-attribute value WRITE_ATTR is greater than or equal to a second threshold write-attribute value, and 3) that the time-attribute value is greater than or equal to a second threshold time-attribute value, and if the target conditions are satisfied, the operation mode OP_MODE may be switched from the second operation mode OP_MODE_2 to the first operation mode OP_MODE_1.

In this case, if the operation mode is the first operation mode, the memory controller 120 may perform control so as not to execute a background operation on the nonvolatile memory set, and if the operation mode is the second operation mode, the memory controller 120 may perform control so as to execute a background operation on the nonvolatile memory set.

Meanwhile, the operation of the memory controller 120 described above may be controlled by the control circuit 123, and may be executed in such a manner that the processor 124 executes (drives) firmware in which the overall operation of the memory controller 120 is programmed.

Figure 18:
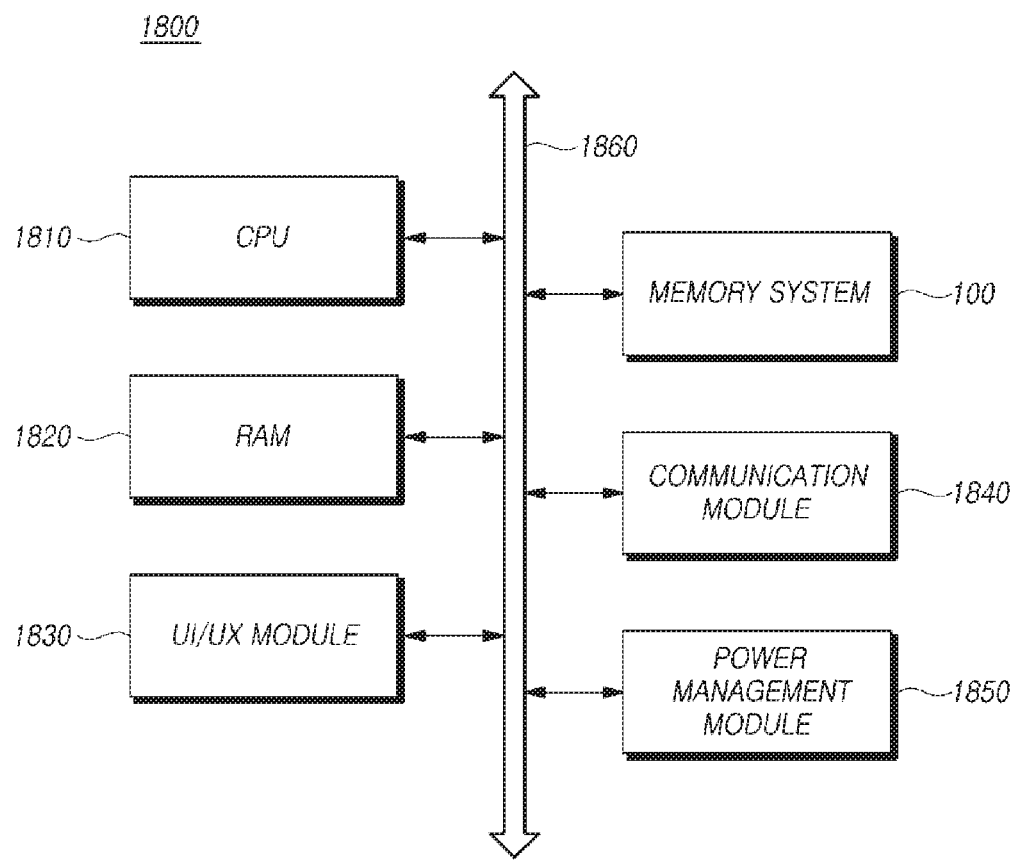
FIG. 18 is a block diagram schematically illustrating a computing system according to embodiments of the present disclosure.

FIG. 18 is a block diagram schematically illustrating a computing system 1800 according to embodiments of the present disclosure.

Referring to FIG. 18, a computing system 1800 according to embodiments of the present disclosure may include a memory system 100 electrically connected to a system bus 1860, a central processing unit (CPU) 1810 for controlling the overall operation of the computing system 1800, a RAM 1820 for storing data and information related to the operation of the computing system 1800, a user interface/user experience (UI/UX) module 1830 for providing a user with a user environment, a communication module 1840 for communicating with an external device through wired and/or wireless communication, and a power management module 1850 for managing the power used by the computing system 1800.

The computing system 1800 according to embodiments of the present disclosure may be a personal computer (PC), or may include a mobile terminal, such as a smart phone, a tablet PC, or the like, or various electronic devices.

The computing system 1800 may further include a battery for supplying an operating voltage, and may further include an application chipset, a graphics-related module, a camera image processor (CIS), a DRAM, and the like. In addition, the configuration of the computing system will be obvious to those skilled in the art.

Meanwhile, the memory system 100 described above may include a device for storing data in a nonvolatile memory, such as a solid state drive (SSD), a universal flash storage (UFS) device, an embedded MMC (eMMC) device, or the like, as well as a device for storing data in a magnetic disk, such as a hard disk drive (HDD). The nonvolatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. In addition, the memory system 100 may be implemented as any of various types of storage devices, and may be mounted to various electronic devices.

According to embodiments of the present disclosure described above, it is possible to provide a memory system, a memory controller, and a method of operating the same, which enable a host to more accurately predict whether or not a memory controller is able to perform a background operation.

In addition, according to embodiments of the present disclosure, it is possible to provide a memory system, a memory controller, and a method of operating the same, which enable a host to handle, in advance, the situation in which a delay time is likely to increase.

In addition, according to embodiments of the present disclosure, it is possible to provide a memory system, a memory controller, and a method of operating the same, which provide higher QoS to a host.

Although various embodiments of the present disclosure has been described for illustrative purposes, those skilled in the art will appreciate that various modifications, additions and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system comprising:
a nonvolatile memory set comprising one or more nonvolatile memories; and
a memory controller configured to control the nonvolatile memory set,
wherein the memory controller is configured to:
calculate a read-attribute value, a write-attribute value, and a time-attribute value for the nonvolatile memory set;
determine an operation mode of the nonvolatile memory set based on at least one of the read-attribute value, the write-attribute value, and the time-attribute value;
control, when the operation mode is a first operation mode, a background operation not to execute on the nonvolatile memory set;
control, when the operation mode is a second operation mode, a background operation to execute on the nonvolatile memory set; and
when set target conditions are satisfied when the operation mode is the second operation mode, stop the background operation on the nonvolatile memory set and switch to a state in which the operation mode is ready to be switched to the first operation mode,
wherein the set target conditions are that the read-attribute value is greater than or equal to a second threshold read-attribute value, and that the write-attribute value is greater than or equal to a second threshold write-attribute value, and that the time-attribute value is greater than or equal to a second threshold time-attribute value.

2. The memory system of claim 1, wherein the memory controller switches the operation mode from the first operation mode to the second operation mode when a read-attribute value is less than or equal to a first threshold read-attribute value, or when a write-attribute value is less than or equal to a first threshold write-attribute value, or when a time-attribute value is less than or equal to a first threshold time-attribute value.

3. The memory system of claim 1, wherein when a command instructing to switch the operation mode to the first operation mode is received from the host, the memory controller switches the operation mode from the second operation mode to the first operation mode.

4. The memory system of claim 1,
wherein the nonvolatile memory set comprises one or more super memory blocks,
wherein each of the super memory blocks comprises one or more memory blocks, and
wherein the memory block included in each of the super memory blocks is included in any one of nonvolatile memories included in the nonvolatile memory set.

5. The memory system of claim 4, wherein the read-attribute value is determined based on a difference between a maximum read-count value of each of the super memory blocks and a threshold read-reclaim read-count value for the super memory block.

6. The memory system of claim 4, wherein the read-attribute value is determined based on a maximum read-count value of each of the super memory blocks, a sum read-count value of each of the super memory blocks, and a threshold read-reclaim read-count value for the super memory block.

7. The memory system of claim 1, wherein when a read-reclaim operation is being performed on the nonvolatile memory set when the operation mode is the second operation mode, the memory controller maintains a minimum read bandwidth for processing a read command received from a host.

8. The memory system of claim 4, wherein the write-attribute value is determined based on a sum of a number of reserved super memory blocks and a number of free super memory blocks, among the super memory blocks included in the nonvolatile memory set.

9. The memory system of claim 8, wherein when the sum of the number of reserved super memory blocks and the number of free super memory blocks is greater than a first threshold number of super memory blocks when the operation mode is the second operation mode, the memory controller is able to switch the operation mode to the first operation mode.

10. The memory system of claim 8, wherein when the sum of the number of reserved super memory blocks included in the nonvolatile memory set and the number of free super memory blocks is less than a second threshold number of super memory blocks when the operation mode is the second operation mode, the memory controller does not switch the operation mode to the first operation mode.

11. A memory controller comprising:
a memory interface configured to communicate with a nonvolatile memory set comprising one or more nonvolatile memories; and
a control circuit configured to:
calculate a read-attribute value, a write-attribute value, and a time-attribute value for the nonvolatile memory set;
determine an operation mode of the nonvolatile memory set based on at least one of the read-attribute value, the write-attribute value, and the time-attribute value;
control, when the operation mode is a first operation mode, a background operation not to execute on the nonvolatile memory set;
control, when the operation mode is a second operation mode, a background operation to execute on the nonvolatile memory set; and
when set target conditions are satisfied when the operation mode is the second operation mode, stop the background operation on the nonvolatile memory set and switch to a state in which the operation mode is ready to be switched to the first operation mode,
wherein the set target conditions are that the read-attribute value is greater than or equal to a second threshold read-attribute value, and that the write-attribute value is greater than or equal to a second threshold write-attribute value, and that the time-attribute value is greater than or equal to a second threshold time-attribute value.

12. The memory controller of claim 11, wherein the operation mode is switched from the first operation mode to the second operation mode when the read-attribute value is less than or equal to a first threshold read-attribute value, or when the write-attribute value is less than or equal to a first threshold write-attribute value, or when the time-attribute value is less than or equal to a first threshold time-attribute value.

13. The memory controller of claim 11,
wherein the nonvolatile memory set comprises one or more super memory blocks,
wherein each of the super memory blocks comprises one or more memory blocks, and
wherein the memory block included in each of the super memory blocks is included in any one of nonvolatile memories included in the nonvolatile memory set.

14. The memory controller of claim 13, wherein the read-attribute value is determined based on a maximum read-count value of each of the super memory blocks, a sum read-count value of each of the super memory blocks, and a threshold read-reclaim read-count value for the super memory block.

15. The memory controller of claim 13, wherein the write-attribute value is determined based on a sum of a number of reserved super memory blocks and a number of free super memory blocks, among the super memory blocks included in the nonvolatile memory set.

16. A method of operating a memory controller for controlling a nonvolatile memory set comprising one or more nonvolatile memories, the method comprising:
calculating a read-attribute value, a write-attribute value, and a time-attribute value for the nonvolatile memory set;
determining an operation mode of the nonvolatile memory set based on at least one of the read-attribute value, the write-attribute value, and the time-attribute value;
controlling, when the operation mode is a first operation mode, a background operation not to execute on the nonvolatile memory set;
controlling, when the operation mode is a second operation mode, a background operation to execute on the nonvolatile memory set; and
when set target conditions are satisfied when the operation mode is the second operation mode, stopping the background operation on the nonvolatile memory set and switching to a state in which the operation mode is ready to be switched to the first operation mode,
wherein the set target conditions are that the read-attribute value is greater than or equal to a second threshold read-attribute value, that the write-attribute value is greater than or equal to a second threshold write-attribute value, and that the time-attribute value is greater than or equal to a second threshold time-attribute value.

17. The method of claim 16, wherein the determining the operation mode of the nonvolatile memory set comprises switching the operation mode from the first operation mode to the second operation mode when the read-attribute value is less than or equal to a first threshold read-attribute value, when the write-attribute value is less than or equal to a first threshold write-attribute value, or when the time-attribute value is less than or equal to a first threshold time-attribute value.

\* \* \* \* \*